(12) United States Patent
Yang

(10) Patent No.: US 9,243,969 B2
(45) Date of Patent: Jan. 26, 2016

(54) METHOD FOR CALIBRATING A FORCE CONSTANT OF A MOTORIZED STAGE USED FOR SUPPORTING AND MOVING A WORKPIECE

(75) Inventor: Pai-Hsueh Yang, Palo Alto, CA (US)

(73) Assignee: Nikon Corporation, Tokyo (JP)

( * ) Notice: Subject to any disclaimer, the term of this patent is extended or adjusted under 35 U.S.C. 154(b) by 681 days.

(21) Appl. No.: 13/228,401

(22) Filed: Sep. 8, 2011

(65) Prior Publication Data

US 2012/0060582 A1 Mar. 15, 2012

Related U.S. Application Data

(60) Provisional application No. 61/381,029, filed on Sep. 8, 2010.

(51) Int. Cl.
| | |
|---|---|
| *G01P 21/00* | (2006.01) |
| *G01L 25/00* | (2006.01) |
| *G01M 99/00* | (2011.01) |

(52) U.S. Cl.
CPC ............. *G01L 25/00* (2013.01); *G01M 99/008* (2013.01)

(58) Field of Classification Search
USPC .................................................. 73/1.08, 1.01
See application file for complete search history.

(56) References Cited

U.S. PATENT DOCUMENTS 6,684,165 B2 * 1/2004 Peisner ........................... 702/41

* cited by examiner

*Primary Examiner* — Robert R Raevis
(74) *Attorney, Agent, or Firm* — Klarquist Sparkman, LLP

(57) ABSTRACT

Methods are disclosed for calibrating a force constant of a movable stage. In an exemplary method, in first and second preliminary pre-stepping motions of the stage, a baseline force and a calibration force, respectively, as exerted by the stage are measured. From a force-variation ratio of the baseline force and calibration force an inverse closed loop factor is estimated. In at least one subsequent pre-stepping motion of the stage before a respective use of the stage for holding an object, a residual force-variation ratio is estimated, a force-compensation factor is updated from the residual force-variation ratio, and a respective force-variation coefficient is determined from the force-compensation factor.

15 Claims, 27 Drawing Sheets

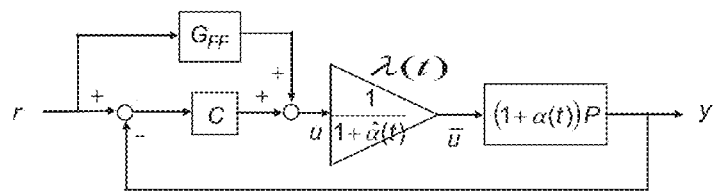
Figure 2. System with gain drift and compensation
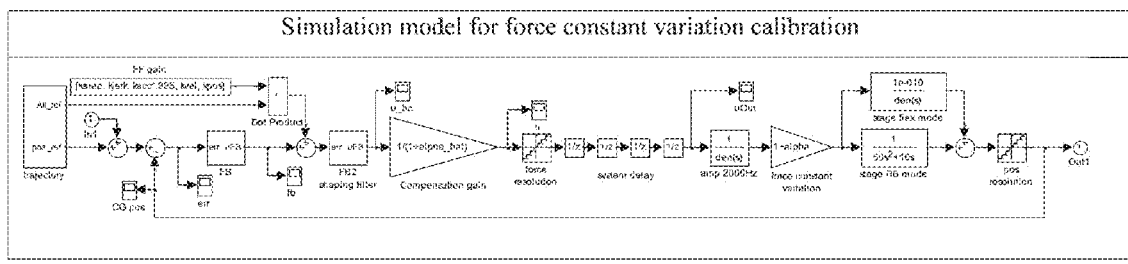
FIG. 3

METHOD FOR CALIBRATING A FORCE CONSTANT OF A MOTORIZED STAGE USED FOR SUPPORTING AND MOVING A WORKPIECE

CROSS-REFERENCE TO RELATED APPLICATION

This application claims priority to, and the benefit of, U.S. Provisional Patent Application No. 61/381,029, filed on Sep. 8, 2010, the contents of which are incorporated herein in their entirety.

FIELD

This disclosure pertains to, inter alia, stages and other workpiece-positioning devices used in precision systems. For example, the disclosure pertains to stages for holding reticles, semiconductor wafers and other lithographic substrates, and the like and for moving these objects relative to an optical system or the like. According to a more specific example, the disclosure pertains to methods for calibrating, substrate-by-substrate, variations in stage-force constant using stage-force command information obtained from object unloading or unloading, or from pre-stepping motions of the stage.

BACKGROUND

In precision systems that perform operations on workpieces and the like, the workpiece is placed on, held by, and moved as required by a stage or other device that undergoes controlled motion relative to a tool, optical system, energy source, or other implement that performs the operation(s) on the workpiece. Such motion can be achieved by any of various actuators. Linear motors and planar motors have become favored for this purpose due to their wide range of motion, accuracy, precision, reliability, and simplicity.

Ongoing development of microlithography as applied to the fabrication of microelectronic devices has resulted in progressively stricter demands on performance and accuracy of microlithography systems. In addition, economic viability of fabrication procedures requires that microlithography systems perform with higher throughput. The need for higher throughput has imposed corresponding needs for greater velocity and acceleration of moving components of the systems, including the stages.

Satisfying demands for greater velocity and acceleration usually results in the stages (e.g., wafer stage) running at higher duty-cycle ratios, which typically results in increased power consumption by the actuators (e.g., linear motors and planar motors) producing stage motion. Greater power consumption often results in the actuators running hotter and contributing more heat to nearby components such as amplifiers in the circuitry used for actuator control. Time-variable changes in temperature of a motor and/or its control circuitry also causes corresponding variations in the motor-force constant and hence in the accuracy of stage performance, particularly over time.

SUMMARY

Needs summarized above are satisfied by methods as disclosed herein. A first embodiment of a method for calibrating a force constant of a movable stage comprises, in first and second preliminary pre-stepping motions of the stage, a baseline force and a calibration force, respectively, exerted by the stage are measured. From a force-variation ratio of the baseline force and calibration force an inverse closed loop factor is estimated. In at least one subsequent pre-stepping motion of the stage before a respective use of the stage for holding an object, a residual force-variation ratio is estimated, the force-compensation factor is updated from the residual force-variation ratio, and a respective force-variation coefficient is determines from the force-compensation factor.

The method can further comprise updating a ratio of force-variation before each use of the stage.

In some embodiments, if the inverse closed-loop factor is regarded as being equal to unity, the force-compensation factor can be determined from a ratio of a force exerted by the stage relative to a baseline force.

The preliminary pre-stepping motions of the stage desirably comprise a first trajectory and a second trajectory, wherein no compensation is applied during the first trajectory.

In many embodiments, subsequent pre-stepping motions of the stage are made for each use of the stage for moving an object.

During the second preliminary pre-stepping motion of the stage, a typical value of the force-variation coefficient can be selected and applied to the force compensation to produce a temperature-variation effect. The inverse closed-loop factor can be estimated as a force-variation ratio of baseline force relative to calibration force, multiplied by the typical value of the force-variation coefficient.

In the at least one subsequent pre-stepping motion of the stage, respective force calibrations can be made before every use of the stage to estimate the residual force-variation ratio. The residual force-variation ratio can estimated with application of the force-compensation factor obtained from calibration of the stage during an immediately preceding use of the stage for holding an object.

In the first and second preliminary pre-stepping motions of the stage, the inverse closed-loop factor can be estimated from the force-variation ratio of the baseline force and calibration force. In the at least one subsequent pre-stepping motion of the stage, the inverse closed-loop factor can be used to estimate the residual force-variation ratio. The force-compensation factor is updated according to the force-variation ratio of a measured stage force obtained during the at least one subsequent pre-stepping motion of the stage, times the inverse closed-loop factor.

Also disclosed herein are various stages calibrated by one of the embodiment of calibration methods summarized above. Also disclosed herein are precision systems (e.g., microlithography systems) comprising such a stage.

Also disclosed herein are stage system, comprising a base portion, a movable stage mass, a motor coupling the movable stage mass to the base portion and actuating motion of the movable stage mass relative to the base portion, and a controller connected to the motor. The controller is configured to perform a calibration of the force constant by executing a method as summarized above.

In another embodiment of the subject methods for calibrating a force constant of a movable stage, a method is provided that comprises executing a first and a second pre-stepping trajectories of the stage. During the first pre-stepping trajectory, a first force ($u_{baseline}$) of the stage is measured under an assumption that the force-variation coefficient $\alpha_{baseline}(t)$ is zero. During the second pre-stepping trajectory, a second force ($u_{calibration}$) of the stage is measured under an assumption that the force-variation coefficient has changed with a corresponding change in stage temperature ($\alpha_{baseline} - \alpha_{calibration}$). An inverse closed-loop factor $\beta$ is determined from a force-difference ratio of the first and second measured forces. A series of multiple stepping trajectories of the stage is executed while measuring respective forces ($u_i$) exerted by the stage. From the determined inverse closed-loop factor β and a force-difference ratio of $u_i$ and $u_{baseline}$, a residual force-variation ratio $\Delta\alpha_i$ is determined for the first stepping trajectory. From the residual force-variation ratio, a force-compensation factor $\lambda_i(t)$ is determined for the first stepping trajectory. From the force-compensation factor, a ratio of the force-variation is updated before each use of the stage.

Calibration methods disclosed herein are simple and can be performed wafer-by-wafer. The calibrations of the time-dependent variations in force constant are achieved using deceleration force-command data from pre-stepping motions of the stage before every wafer exposure. The inverse closed-loop factor can be easily estimated from an extra pre-stepping motion performed during the baseline force measurement. The methods significantly enhance calibration effectiveness without the need for using perfect force commands. The effectiveness of the calibration method is not affected by plant flexible-mode dynamics and sensor/force resolutions.

The foregoing and additional features and advantages of the subject methods will be more readily apparent from the following detailed description, which proceeds with reference to the accompanying drawings.

BRIEF DESCRIPTIONS OF THE DRAWINGS

FIG. 2 is a control diagram of an embodiment of a closed-loop stage system with a time-va the riant plant P, where α(t) is the gain-variation coefficient of the plant P.

FIG. 3 is a simulation model for calibrating variations in the force constant, including a rigid plant model.

Figure 4A:
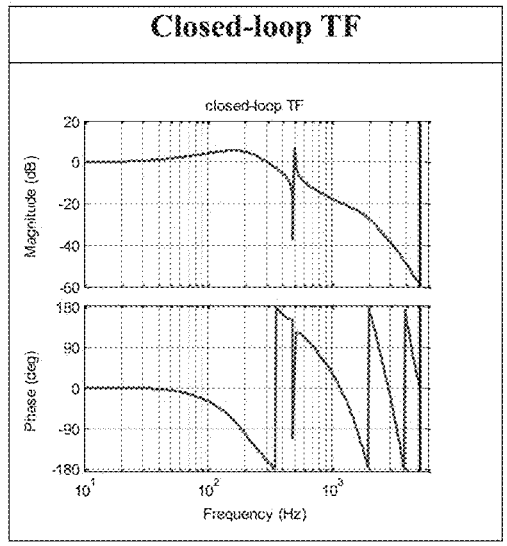
FIG. 4A is a Bode plot of the closed-loop transfer function, wherein the system bandwidth of the closed loop is tuned to approximately 200 Hz.
Figure 4B:
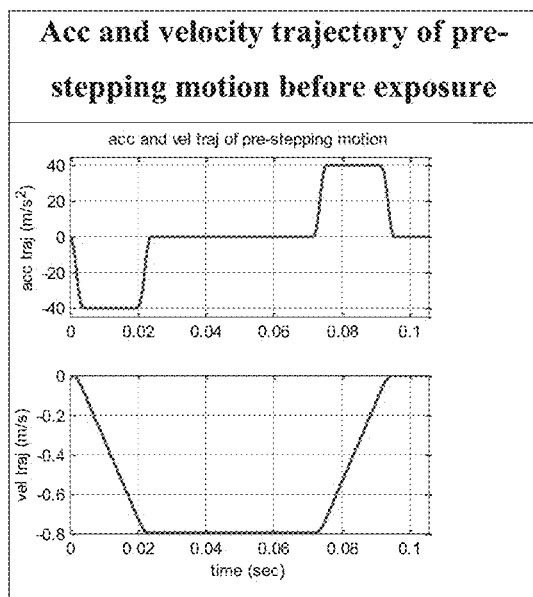

FIG. 4B includes plots of velocity and acceleration trajectories of a pre-stepping motion of the stage executed before using the stage for making lithographic exposures.

Figure 4C:
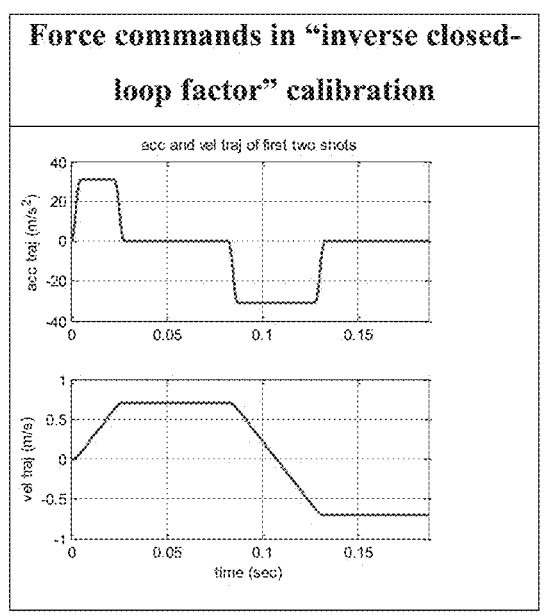

FIG. 4C includes plots of velocity and acceleration trajectories of the first two exposure "shots."

Figure 5A:
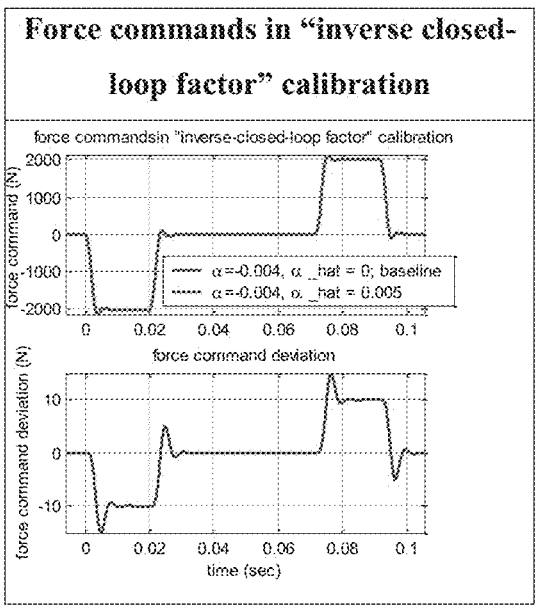

FIG. 5A includes plots of force commands for two stepping motions (velocity and acceleration).

Figure 5B:
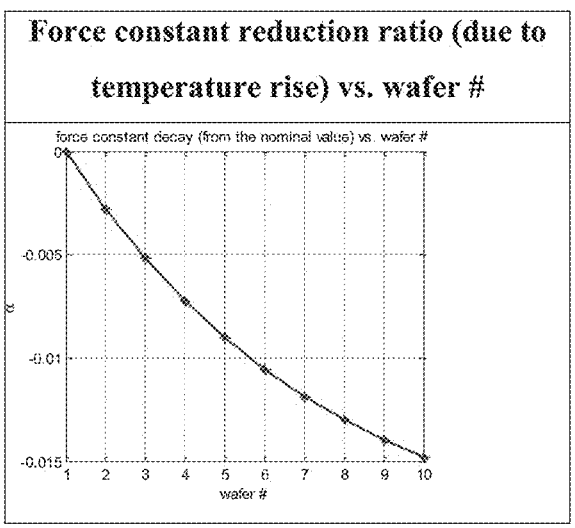

FIG. 5B is a plot showing a reduction in the force-constant ratio (due to temperature rise) from wafer #1 to wafer #10.

Figure 6A:
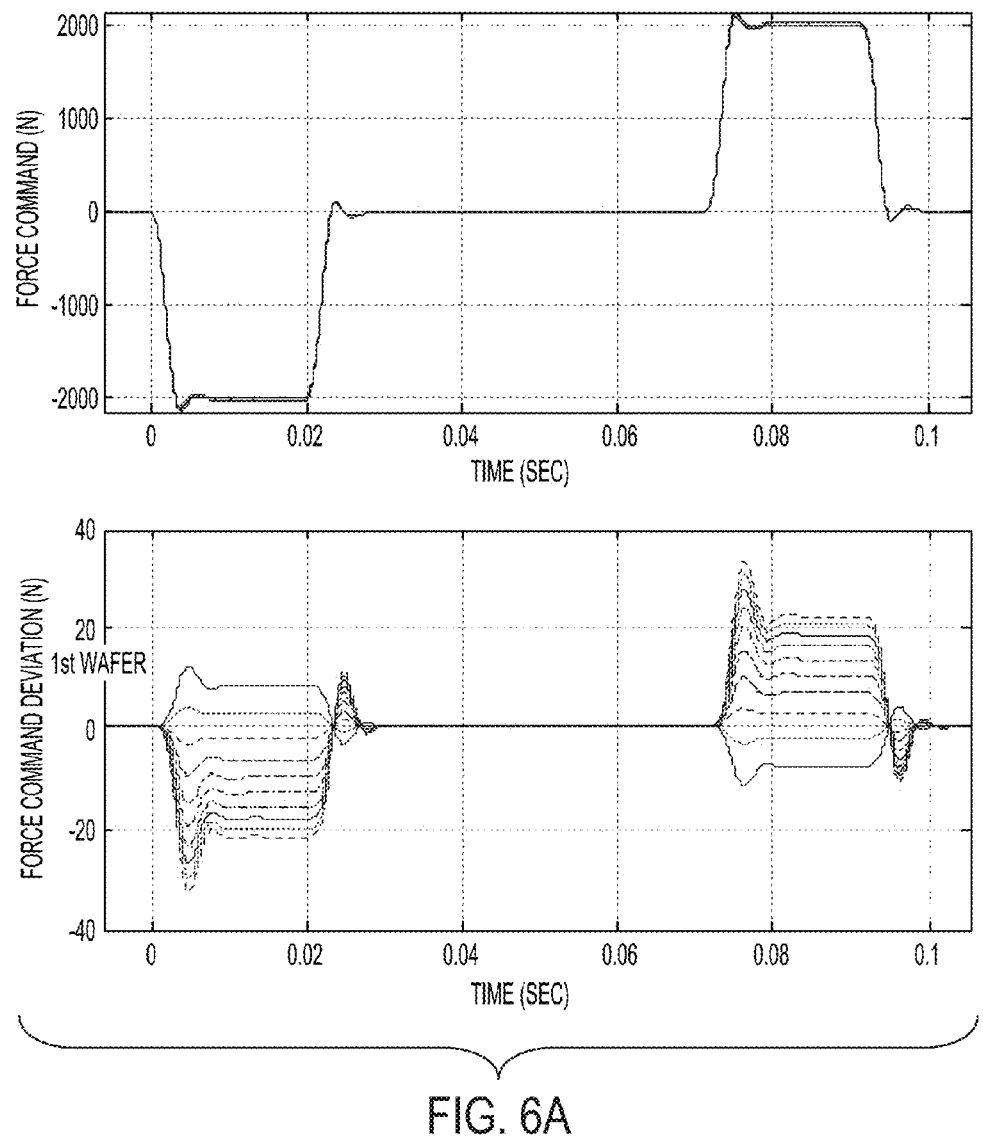

FIG. 6A includes plots, obtained without calibration, of force commands versus time. The upper plot is of the force command, and the lower plot is of force-command deviation from baseline for each of wafers 1-10. These plots reveal an exemplary change in force command during pre-stepping motions of the stage.

Figure 6B:
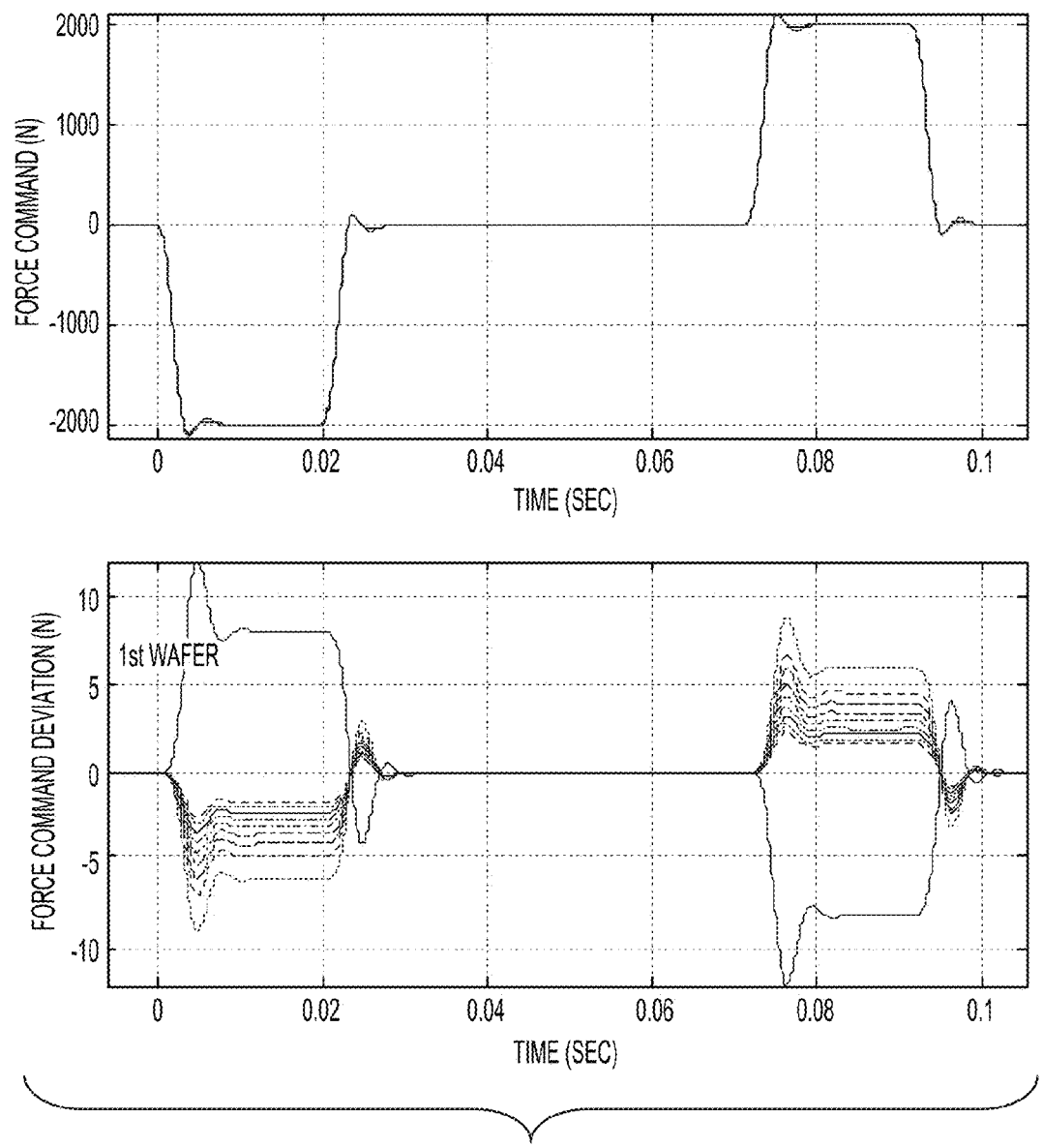

FIG. 6B is similar to FIG. 6A, but the plotted data follow calibration without "beta" (i.e., β, the inverse-closed-loop factor).

Figure 6C:
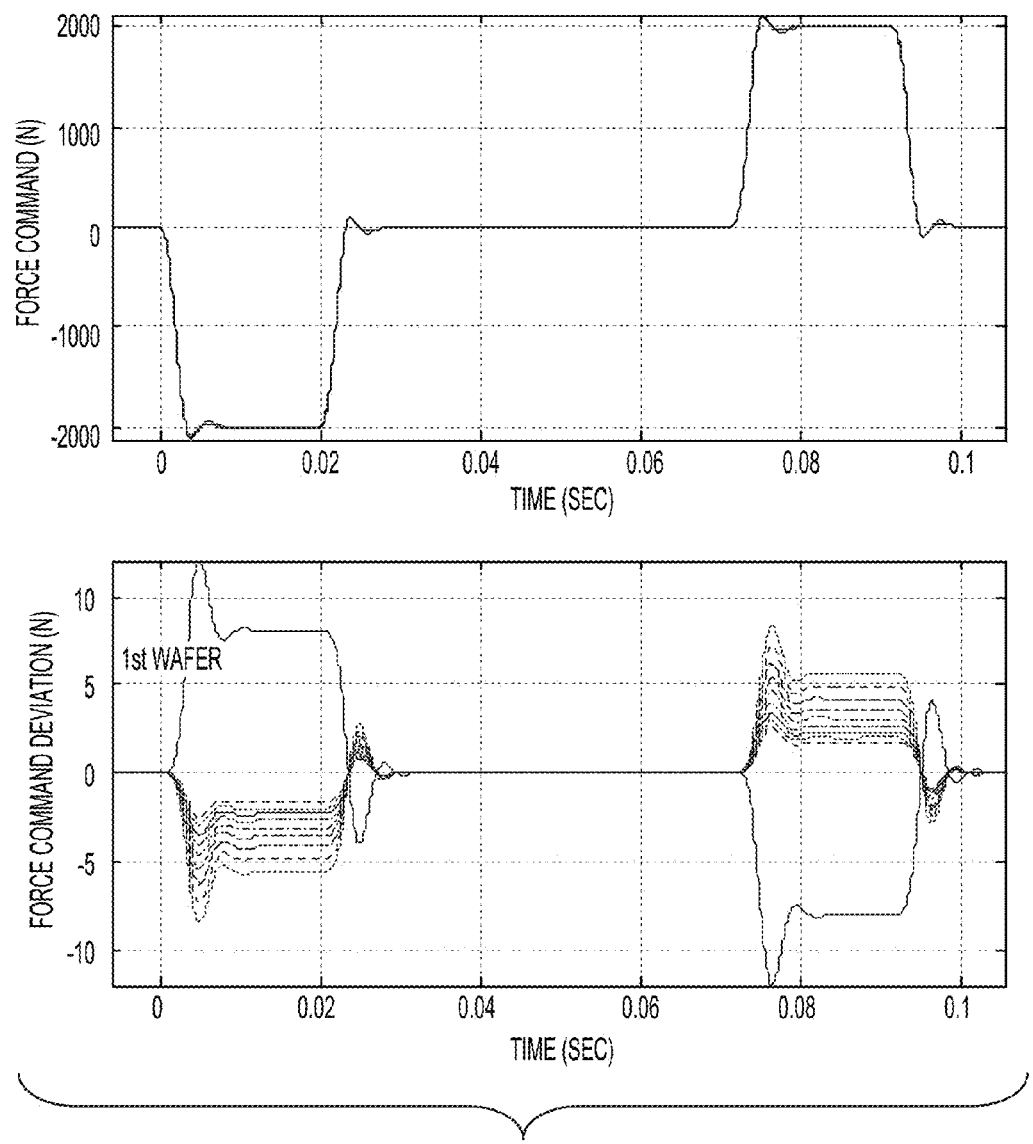

FIG. 6C is similar to FIG. 6A, but the plotted data follow calibration with beta.

Figure 7A:
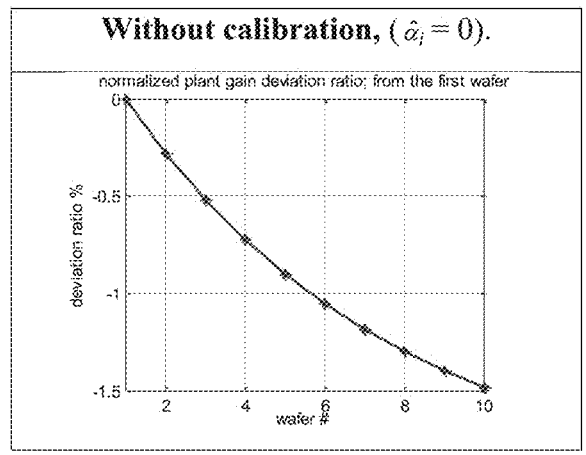

FIG. 7A is a plot of the normalized plant-gain deviation ratio (force-deviation ratio) without calibration, for each of wafers 1-10.

Figure 7B:
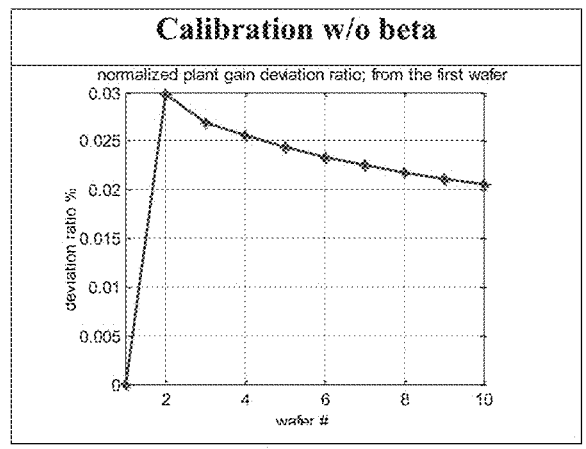

FIG. 7B is similar to FIG. 7A, but the plotted data follow calibration without beta (β).

Figure 7C:
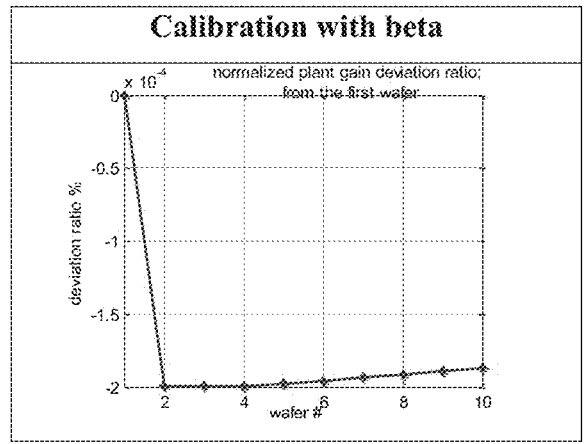

FIG. 7C is similar to FIG. 7A, but the plotted data follow calibration with beta.

Figure 8A:
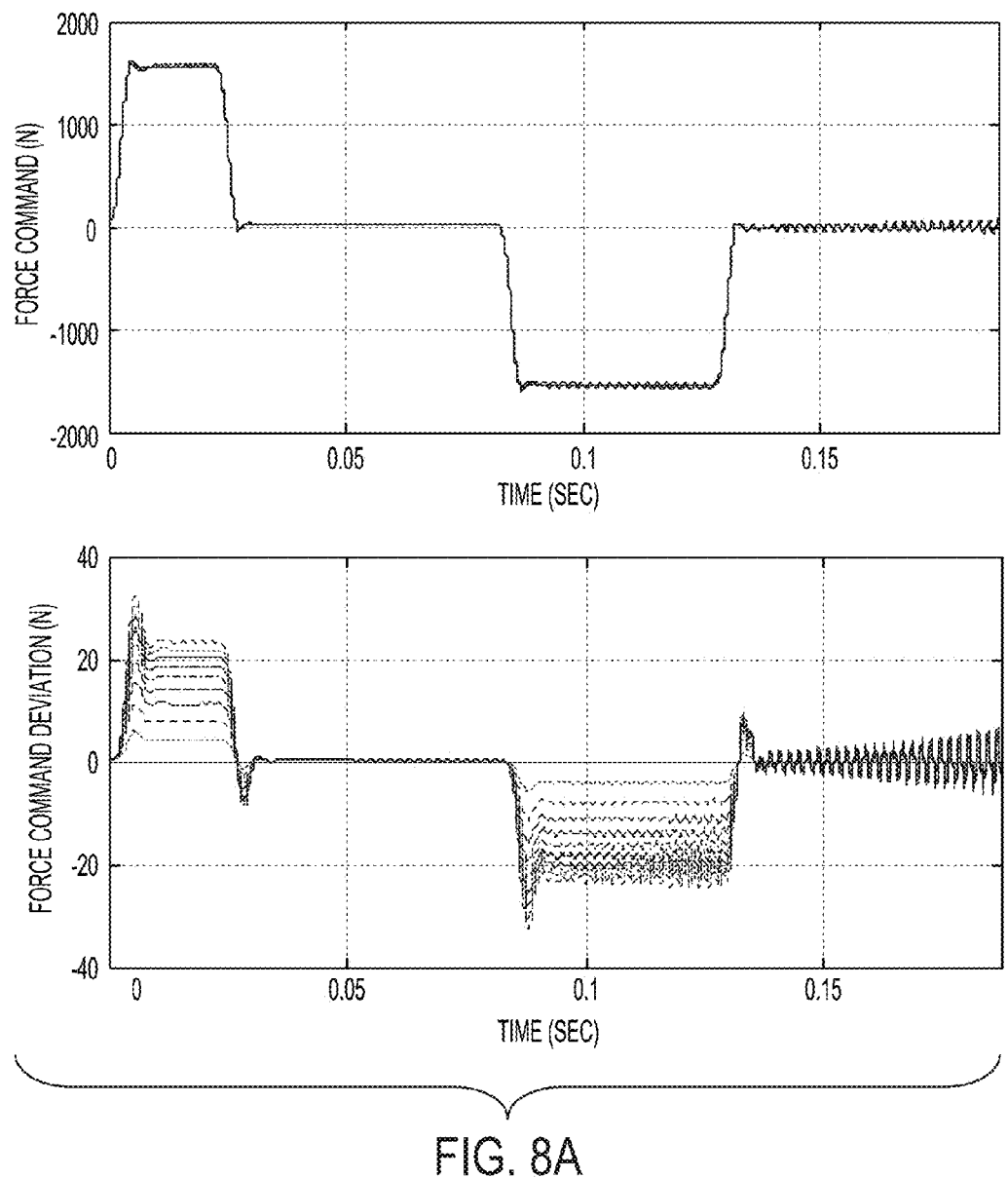

FIG. 8A is a time-based plot of the uncalibrated first two shot-force commands for each of wafers 1-10 during exposure (upper plot) and of force-command deviations from the force command of the first wafer (lower plot).

Figure 8B:
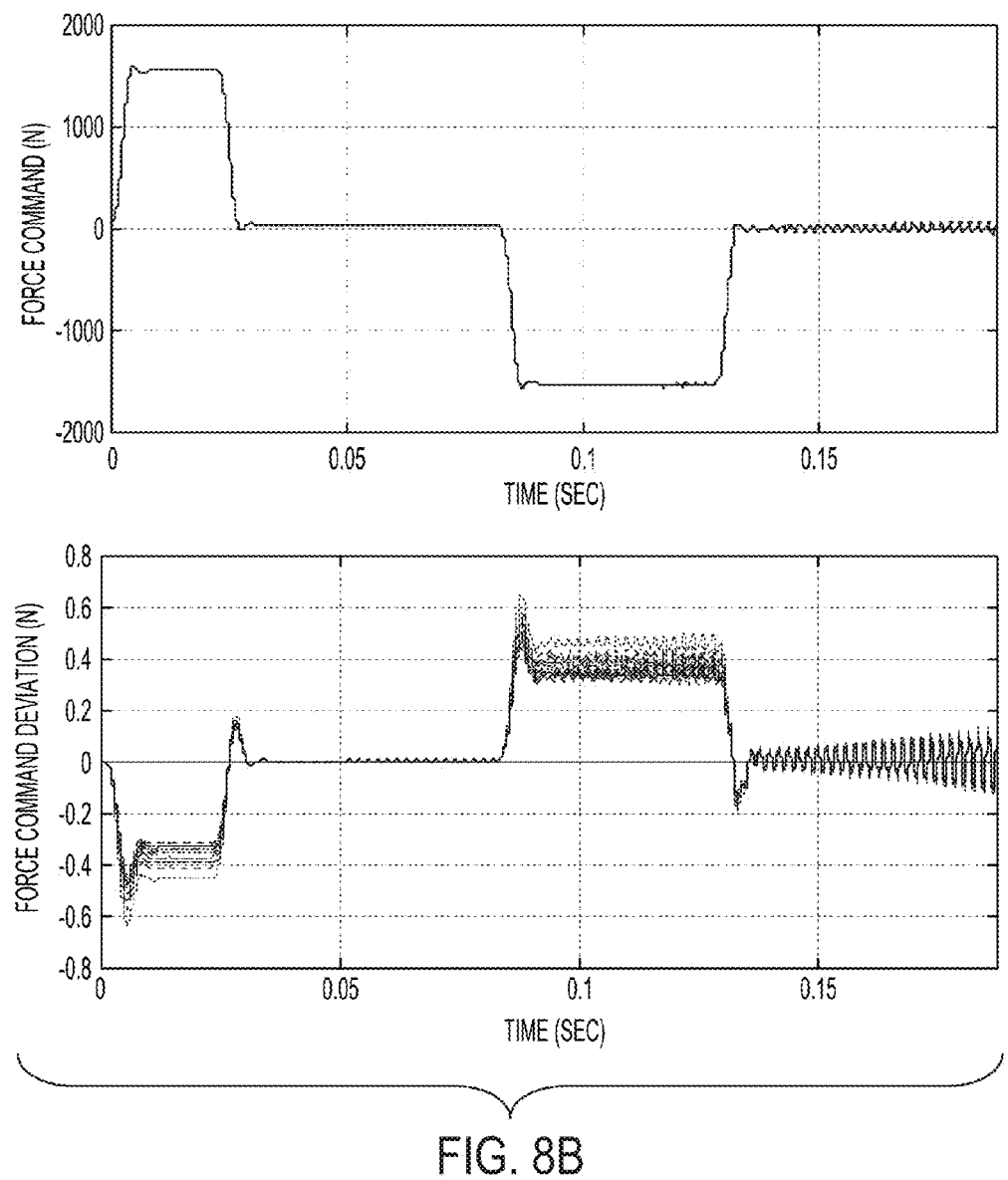

FIG. 8B is similar to FIG. 8A, but the plotted data follow calibration without beta.

Figure 8C:
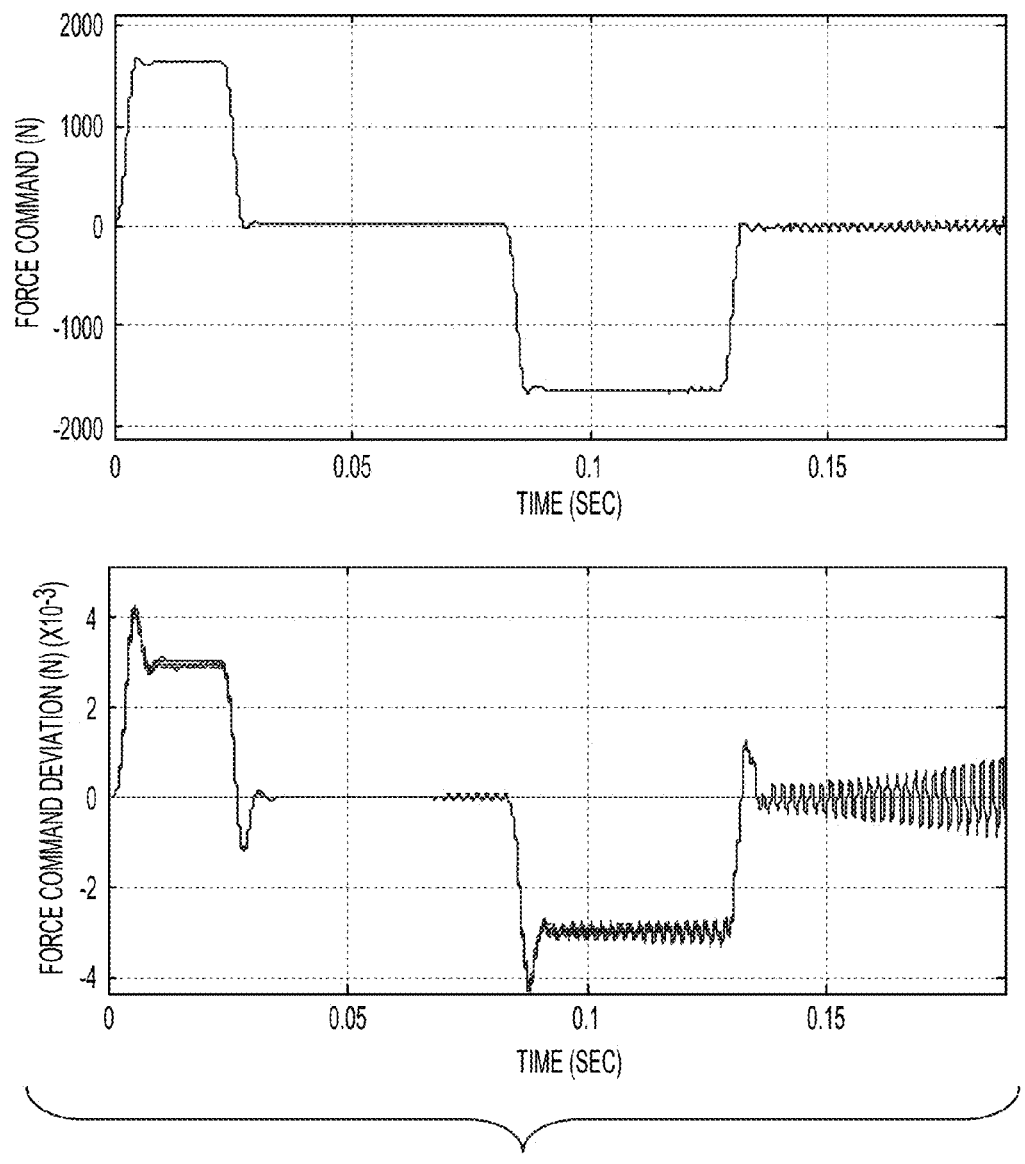

FIG. 8C is similar to FIG. 8A, but the plotted data follow calibration with beta.

Figure 9A:
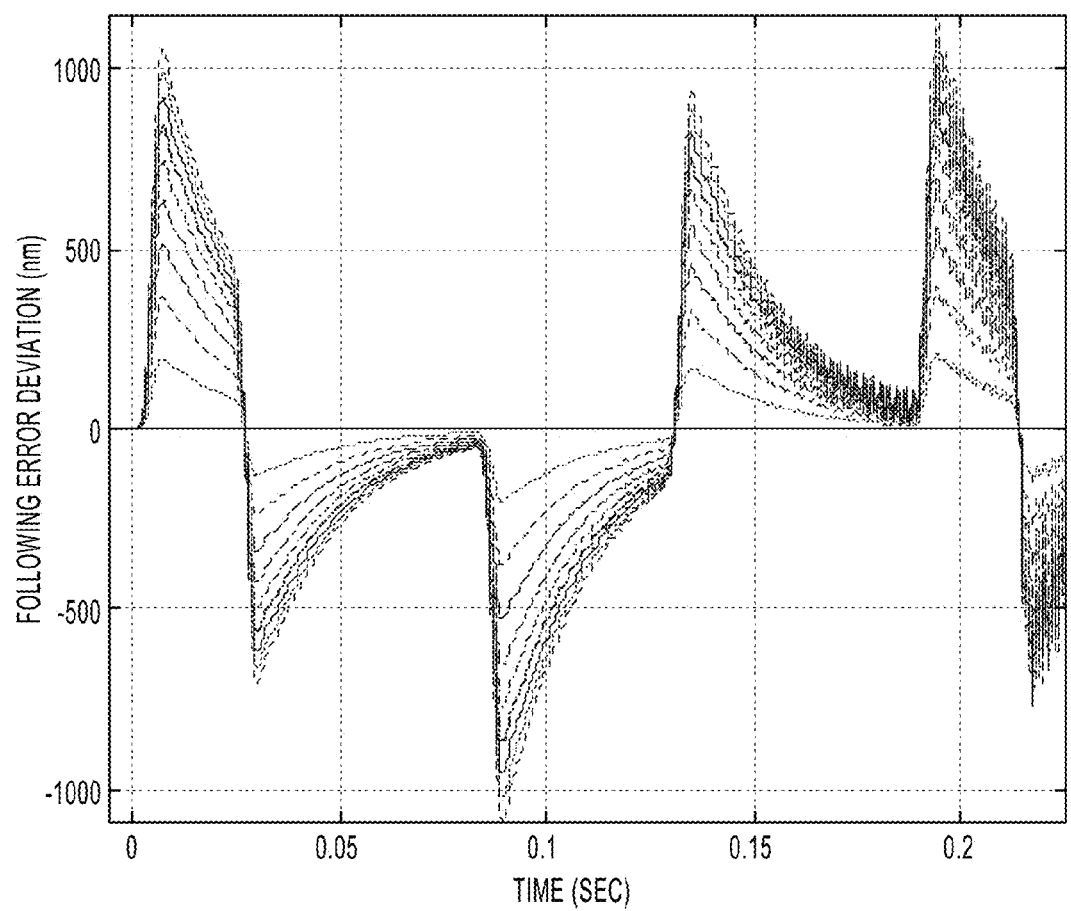

FIG. 9A is a time-based plot of the uncalibrated deviation of plant following-error for each of wafers 1-10.

Figure 9B:
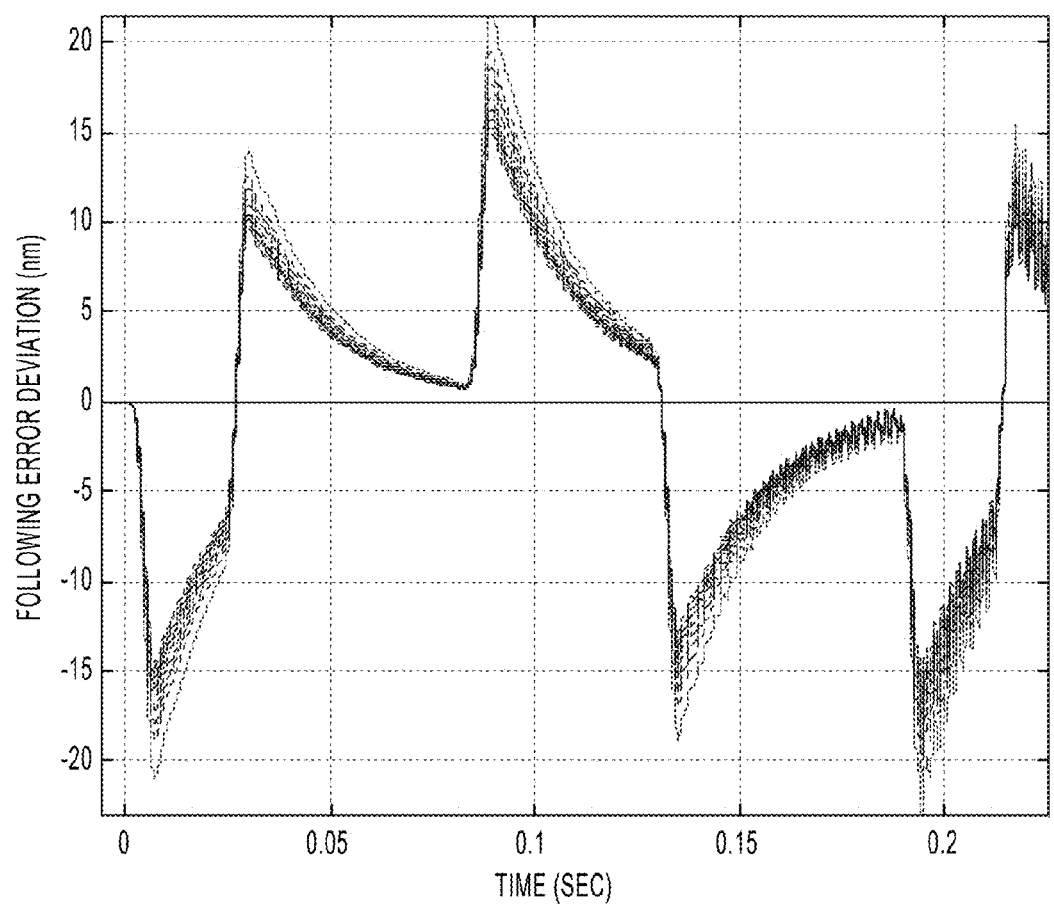

FIG. 9B is similar to FIG. 9A, but the plotted data follow calibration without beta.

Figure 9C:
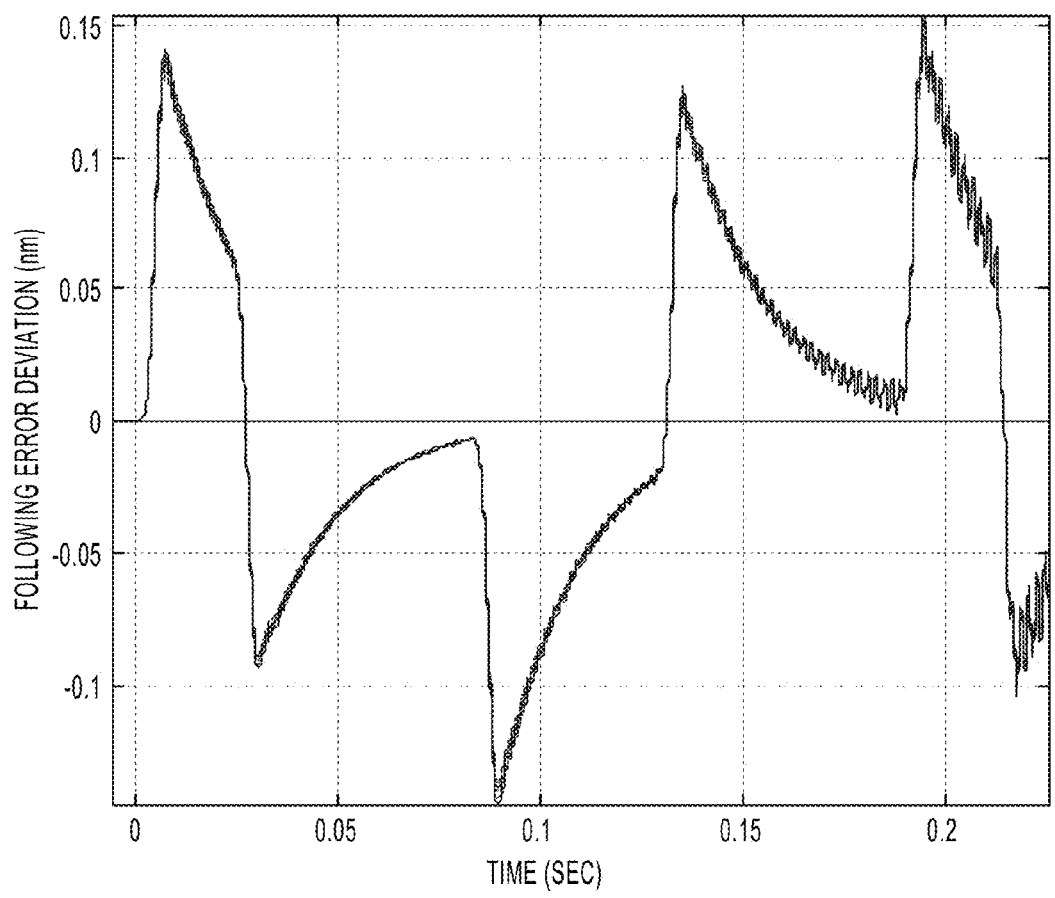

FIG. 9C is similar to FIG. 9A, but the plotted data follow calibration with beta.

Figure 10A:
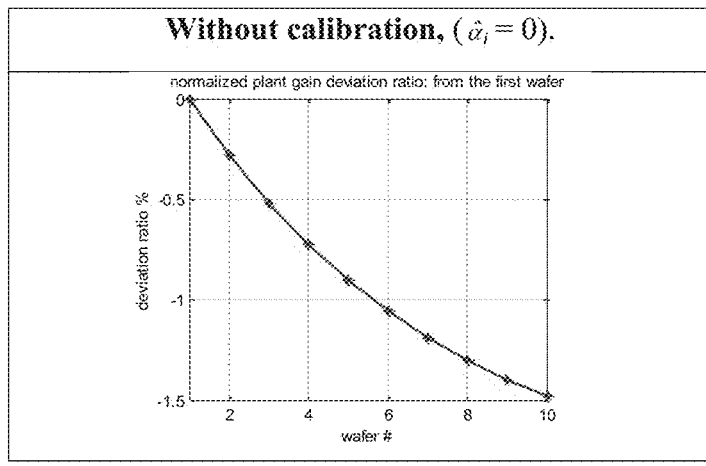

FIG. 10A is a plot of uncalibrated normalized plant-gain deviation ratios (force-deviation ratios) exhibited during respective movements of wafers 1-10.

Figure 10B:
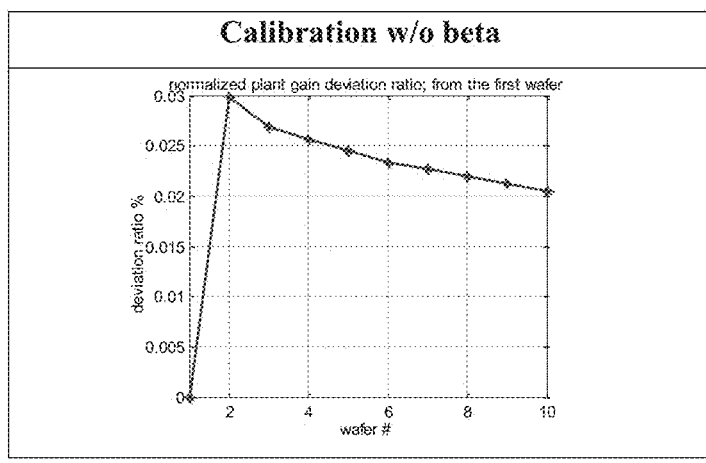

FIG. 10B is similar to FIG. 10A, but the plotted data follow calibration without beta.

Figure 10C:
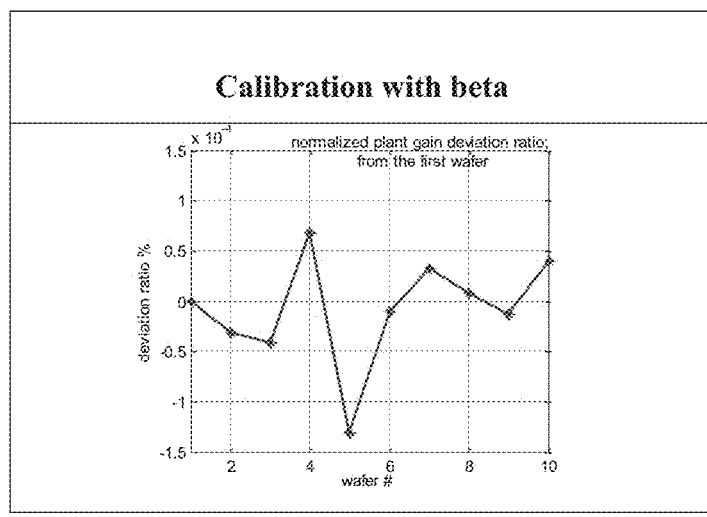

FIG. 10C is similar to FIG. 10A, but the plotted data follow calibration with beta.

Figure 11A:
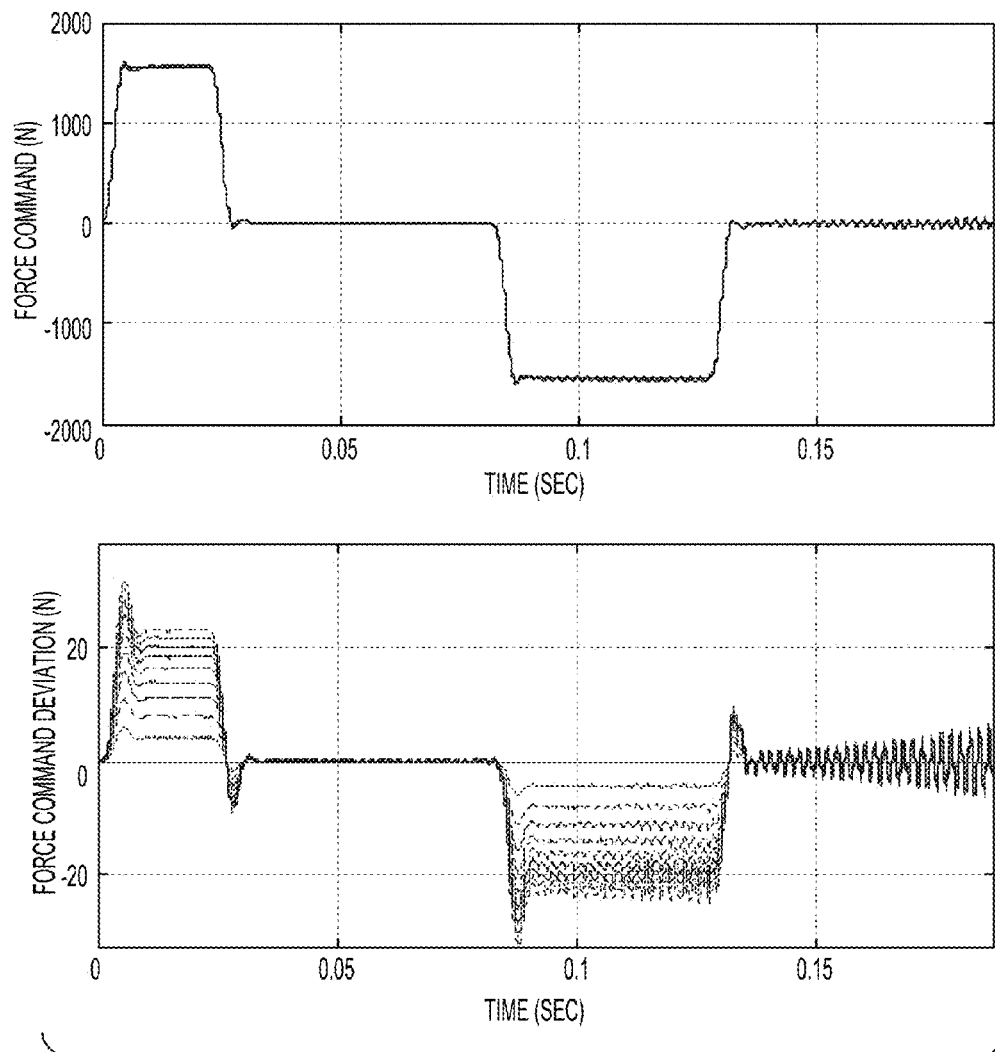

FIG. 11A is a time-based plot of uncalibrated force commands, during exposure, for the first two shots (upper plot) and of force-command deviations from the first wafer (lower plot).

Figure 11B:
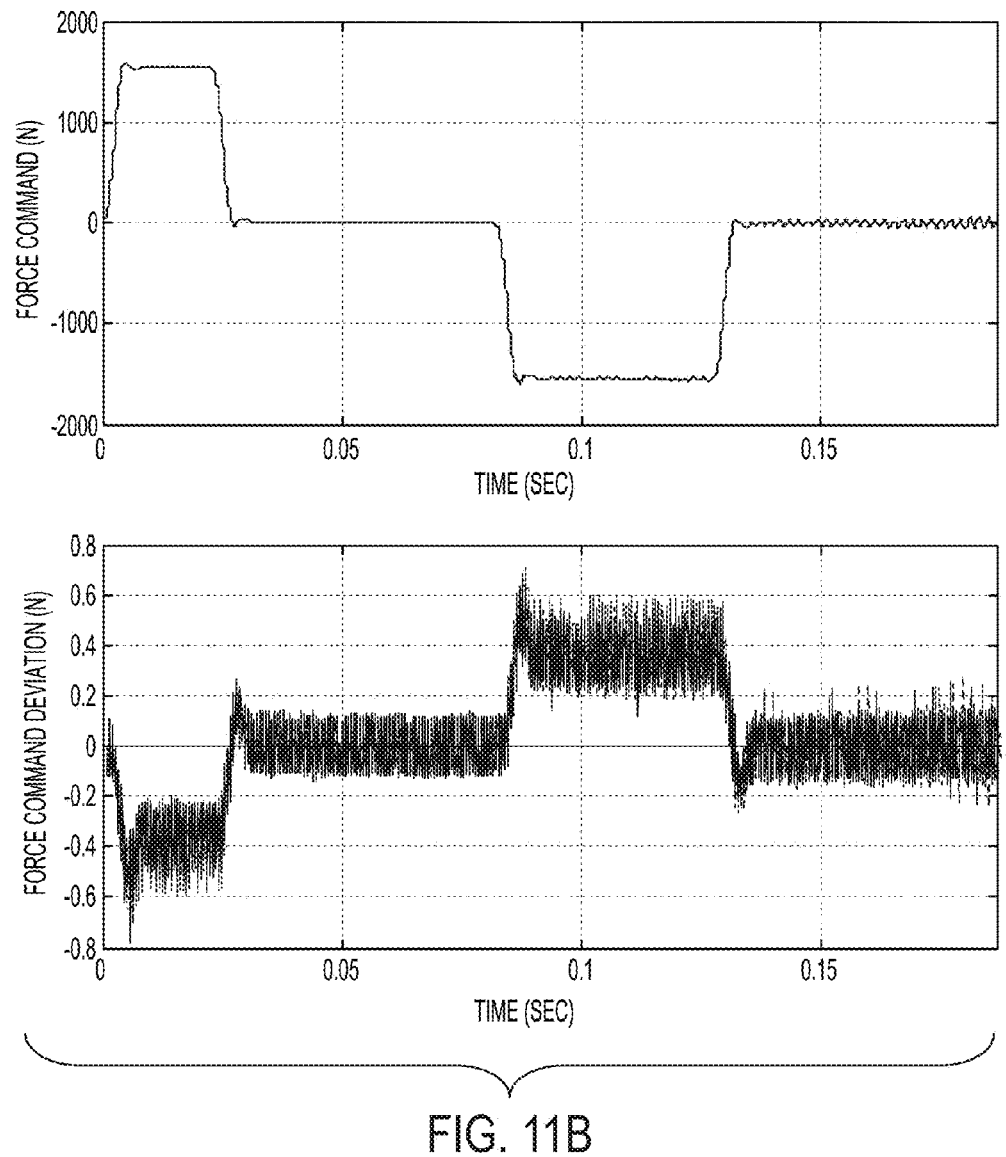

FIG. 11B is similar to FIG. 11A, but the plotted data follow calibration without beta.

Figure 11C:
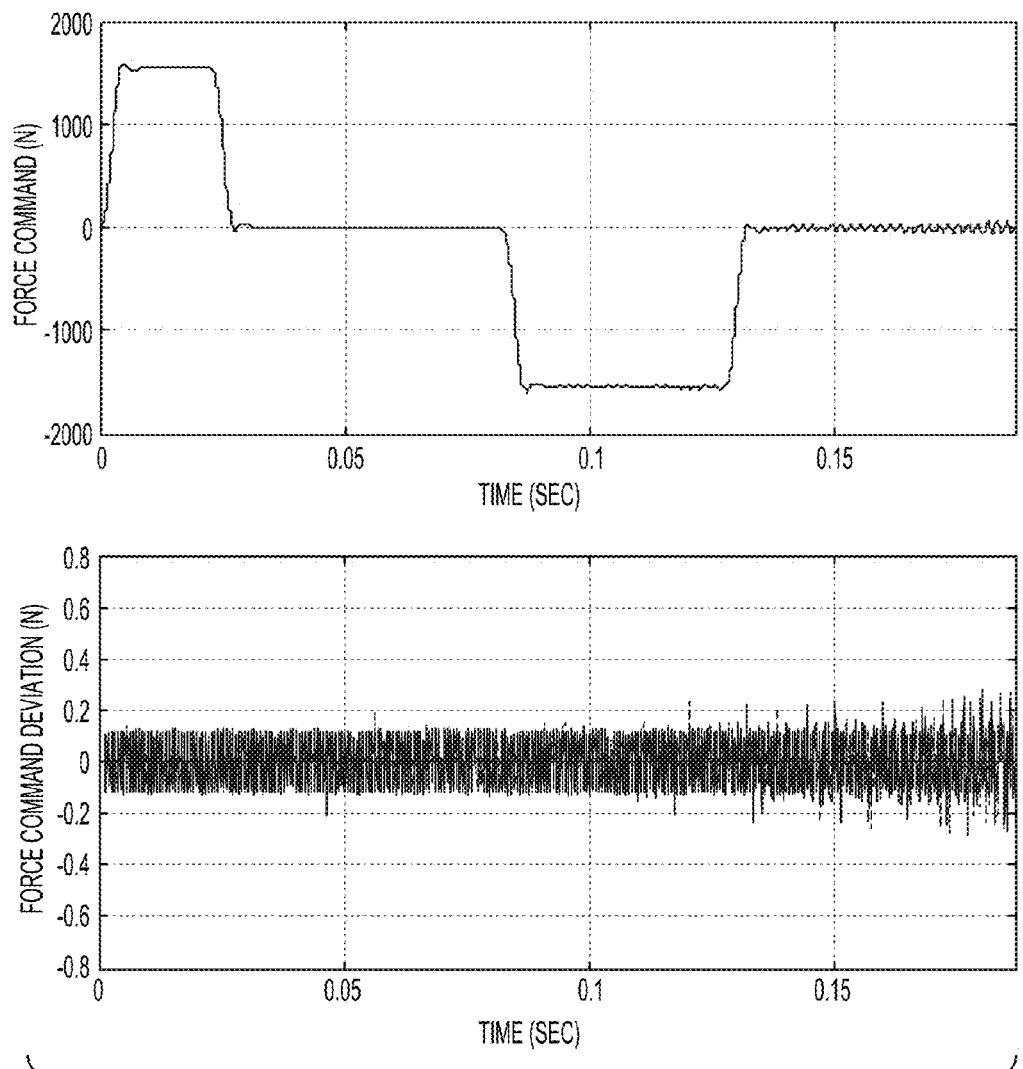

FIG. 11C is similar to FIG. 11A, but the plotted data follow calibration with beta.

Figure 12A:
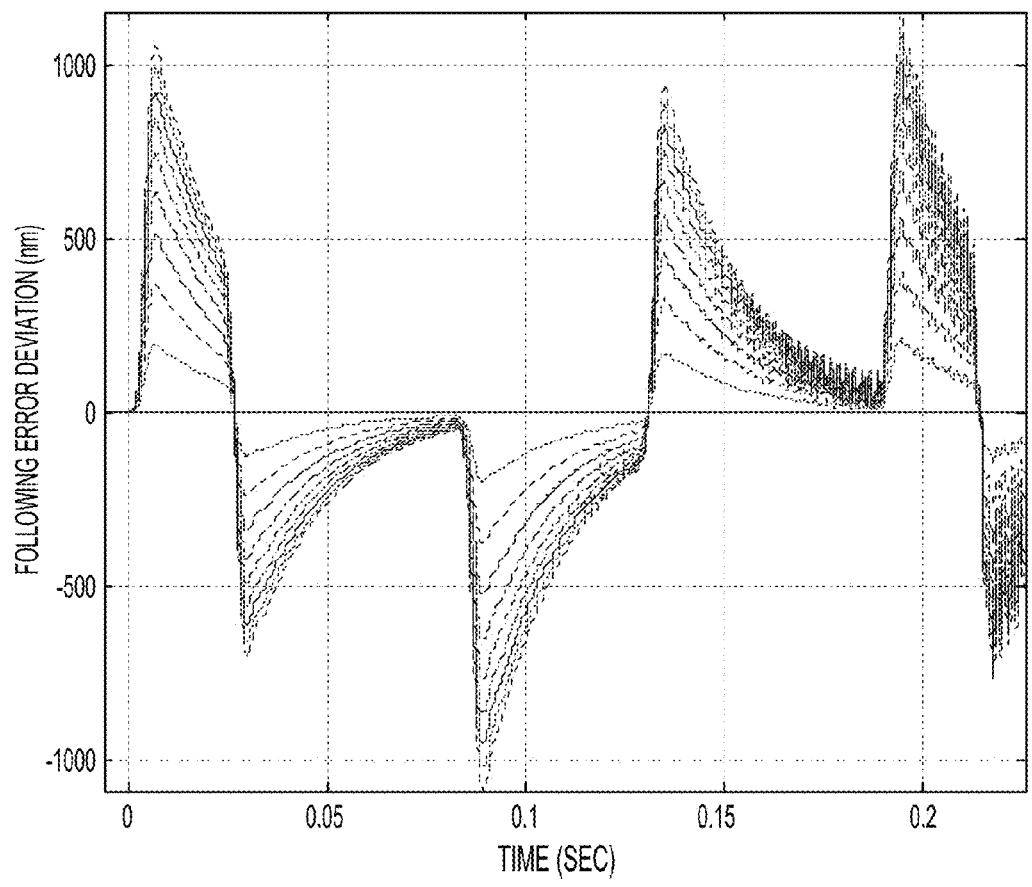

FIG. 12A is a time-based plot of uncalibrated deviations of following-error, relative to the first wafer.

Figure 12B:
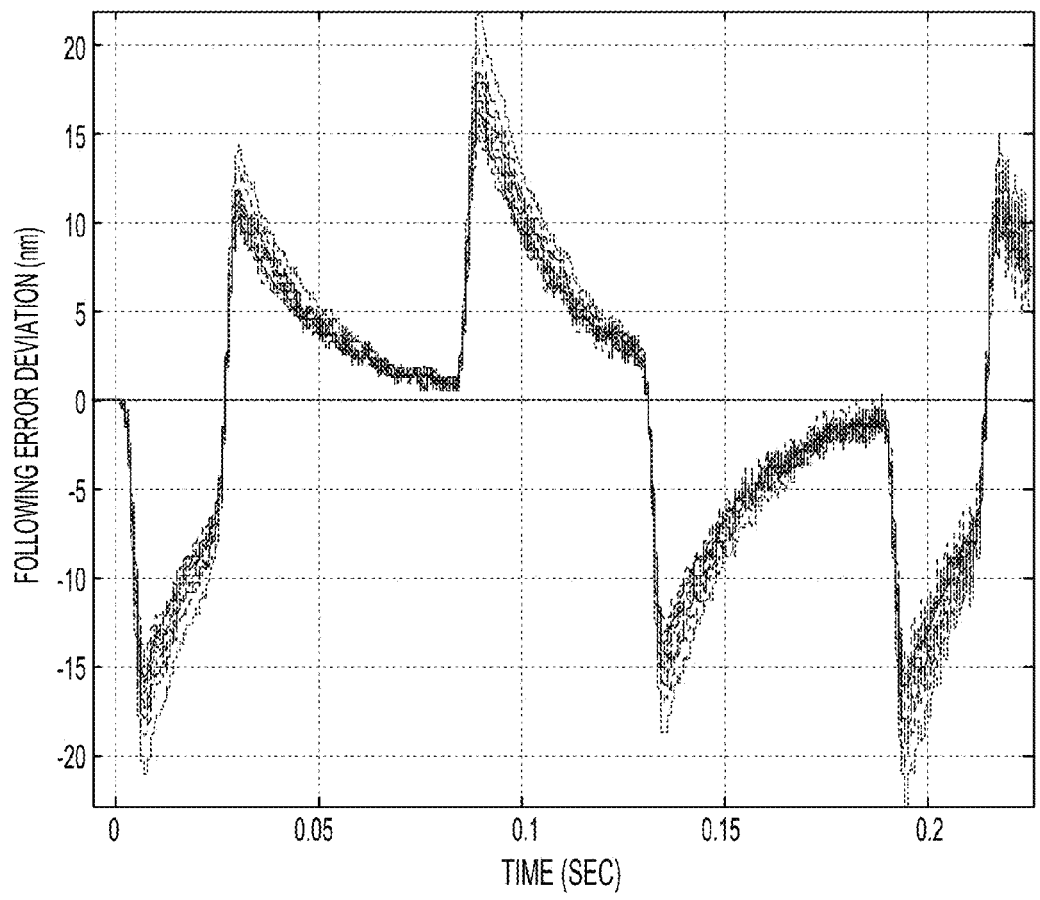

FIG. 12B is similar to FIG. 12A, but the plotted data follow calibration without beta.

Figure 12C:
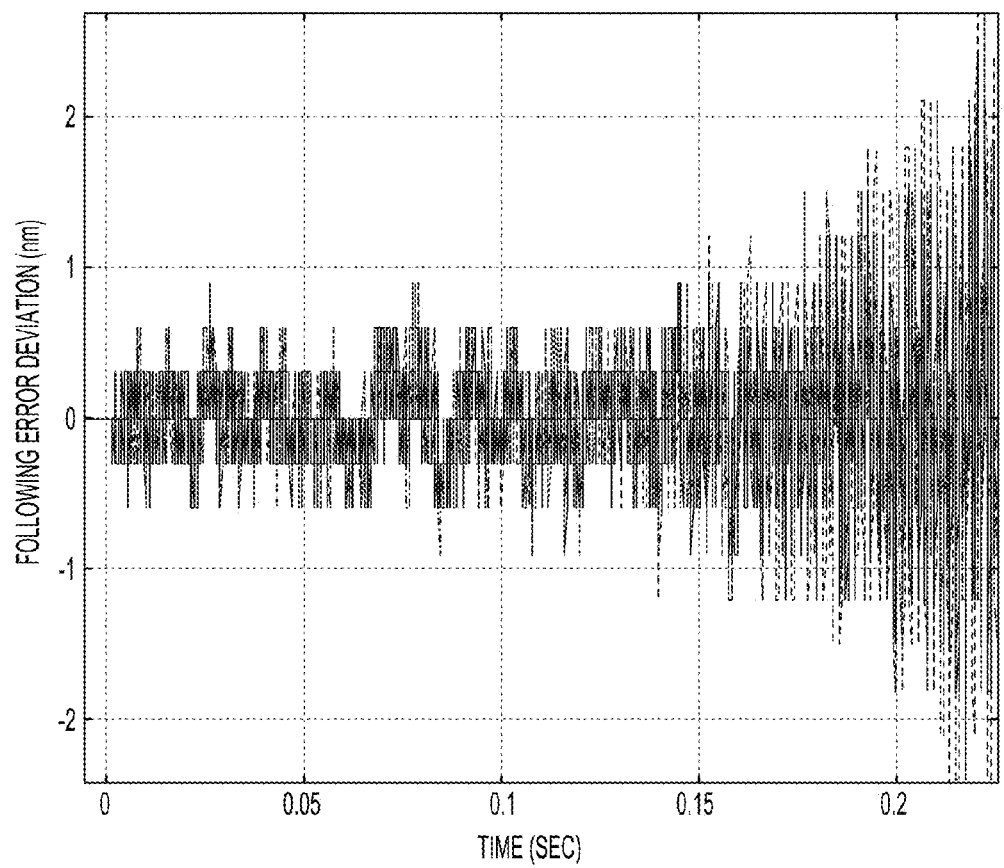

FIG. 12C is similar to FIG. 12A, but the plotted data follow calibration with beta.

Figure 13:
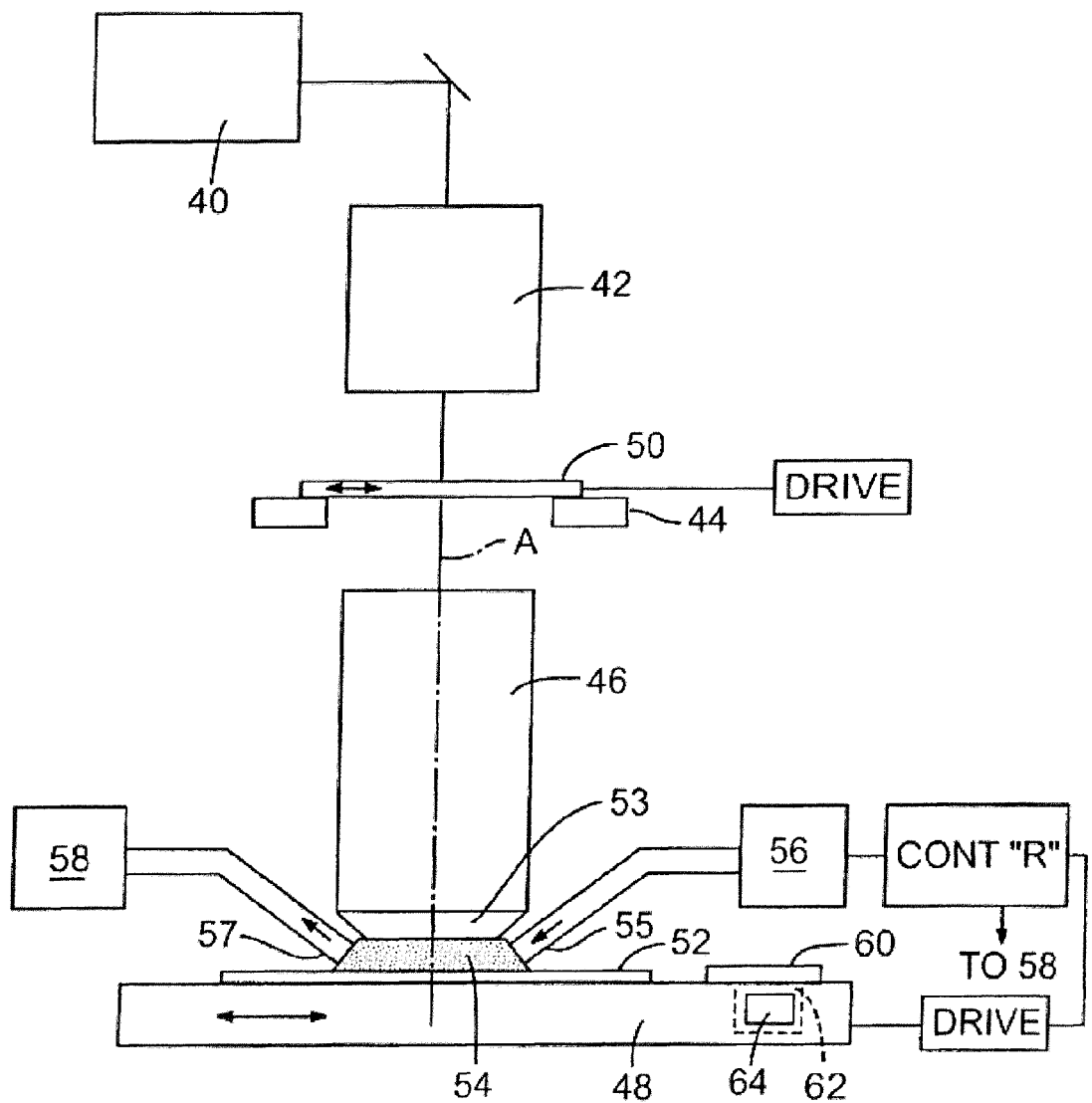

FIG. 13 is a schematic diagram of an immersion microlithography system, which is a first example of a precision system including a stage assembly as described herein.

Figure 14:
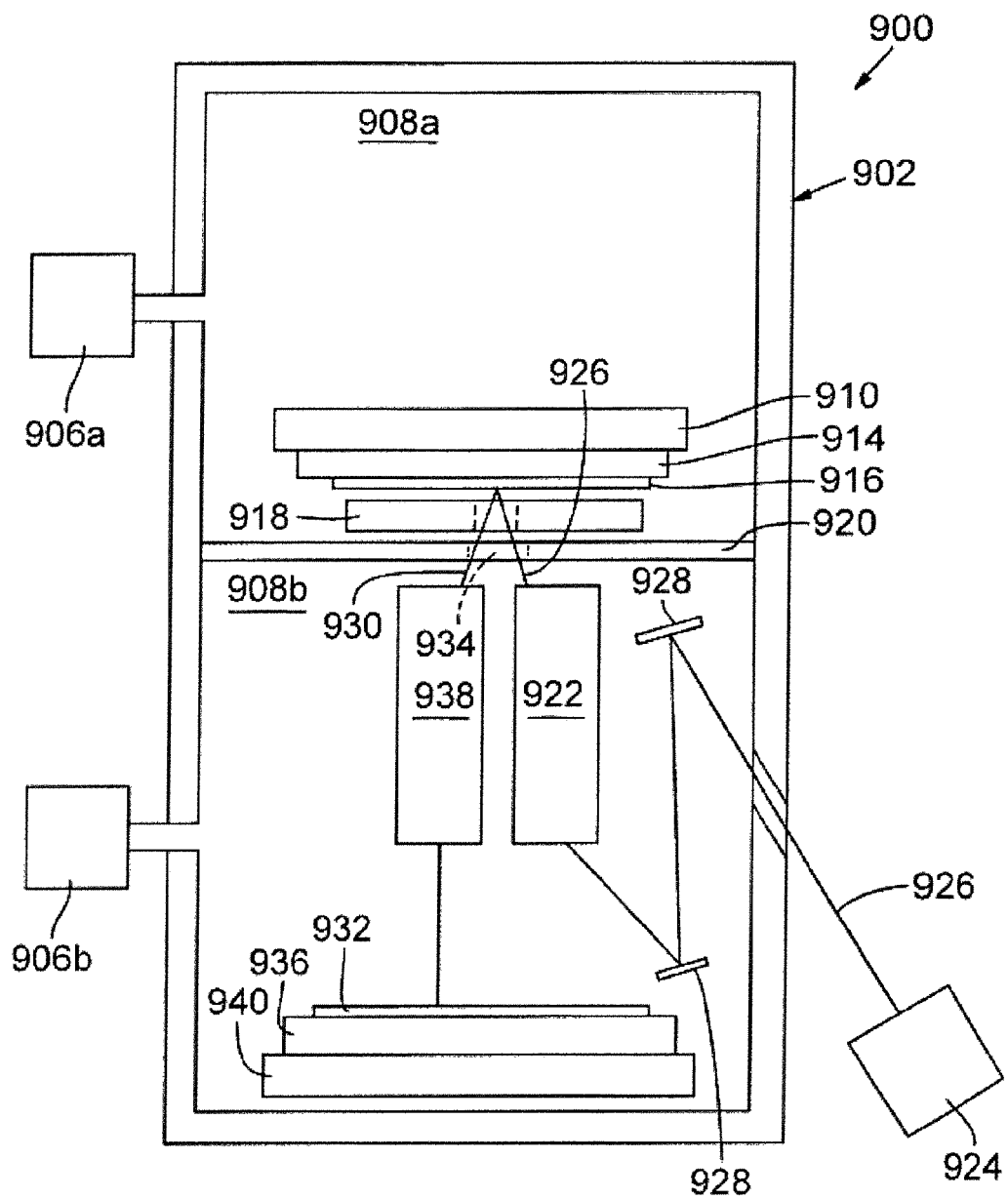

FIG. 14 is a schematic diagram of an extreme-UV microlithography system, which is a second example of a precision system including a stage assembly as described herein.

Figure 15:
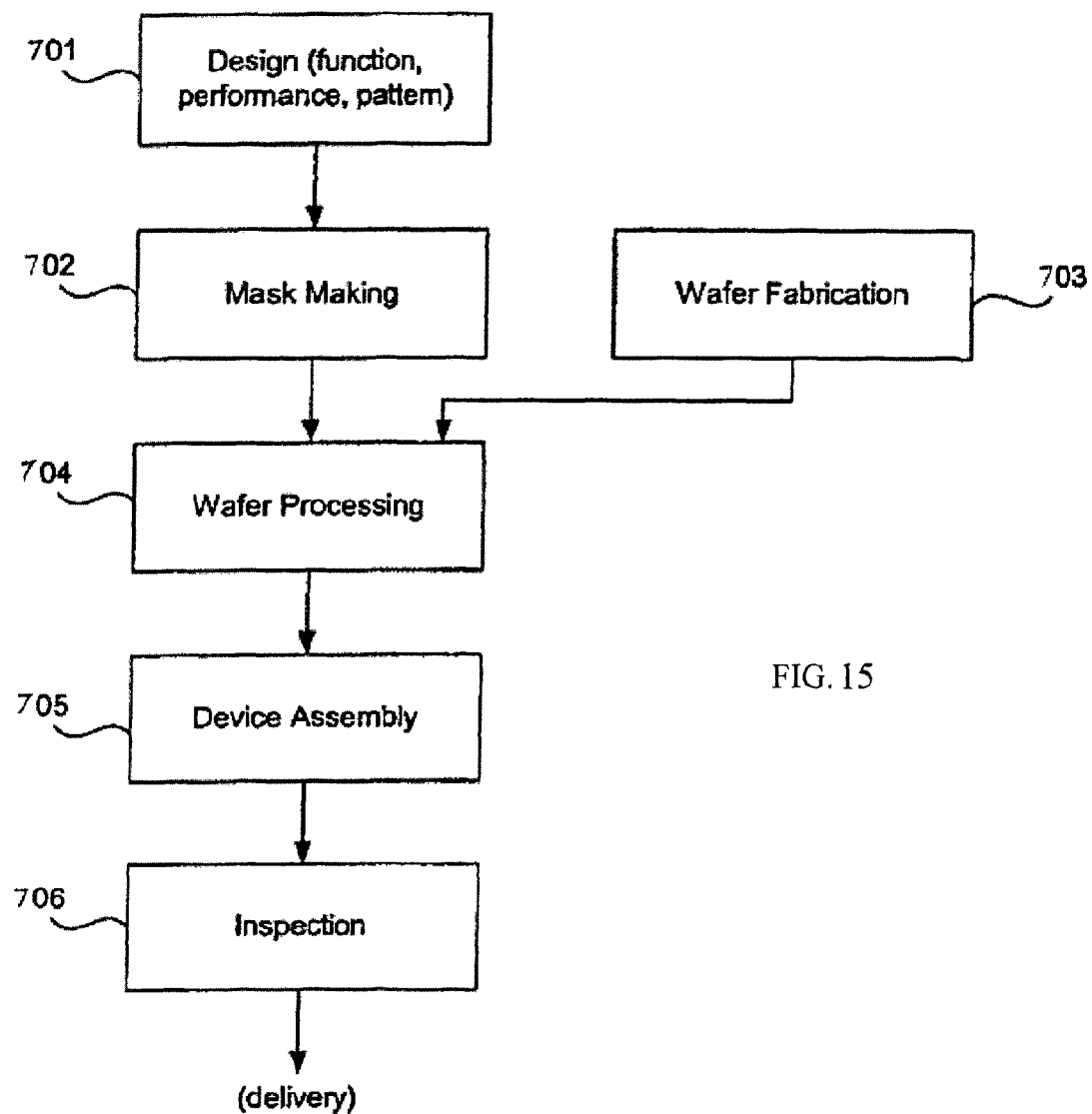

FIG. 15 is a process-flow diagram depicting exemplary steps associated with a process for fabricating semiconductor devices.

Figure 16:
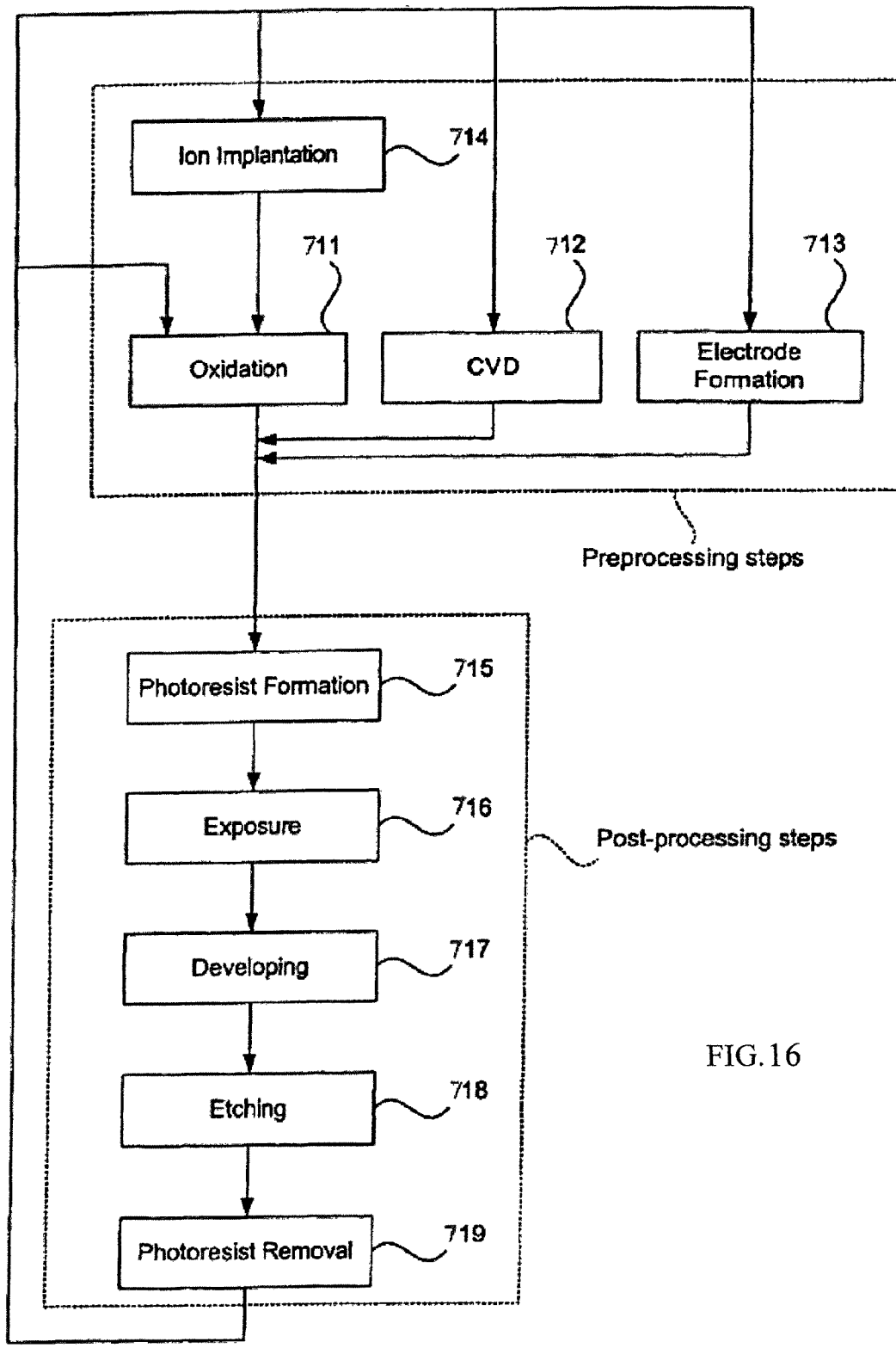

FIG. 16 is a process-flow diagram depicting exemplary steps associated with a processing a substrate (e.g., a wafer), as would be performed, for example, in step 704 in the process shown in FIG. 15.

DETAILED DESCRIPTION

This disclosure is set forth in the context of representative embodiments that are not intended to be limiting in any way.

The drawings are intended to illustrate the general manner of construction and are not necessarily to scale. In the detailed description and in the drawings themselves, specific illustrative examples are shown and described herein in detail. It will be understood, however, that the drawings and the detailed description are not intended to limit the invention to the particular forms disclosed, but are merely illustrative and intended to teach one of ordinary skill how to make and/or use the invention claimed herein.

As used in this application and in the claims, the singular forms "a," "an," and "the" include the plural forms unless the context clearly dictates otherwise. Additionally, the term "includes" means "comprises." Further, the term "coupled" encompasses mechanical as well as other practical ways of coupling or linking items together, and does not exclude the presence of intermediate elements between the coupled items.

The described things and methods described herein should not be construed as being limiting in any way. Instead, this disclosure is directed toward all novel and non-obvious features and aspects of the various disclosed embodiments, alone and in various combinations and sub-combinations with one another. The disclosed things and methods are not limited to any specific aspect or feature or combinations thereof, nor do the disclosed things and methods require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and method. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In the following description, certain terms may be used such as "up," "down,", "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Stage Assembly

Figure 1:
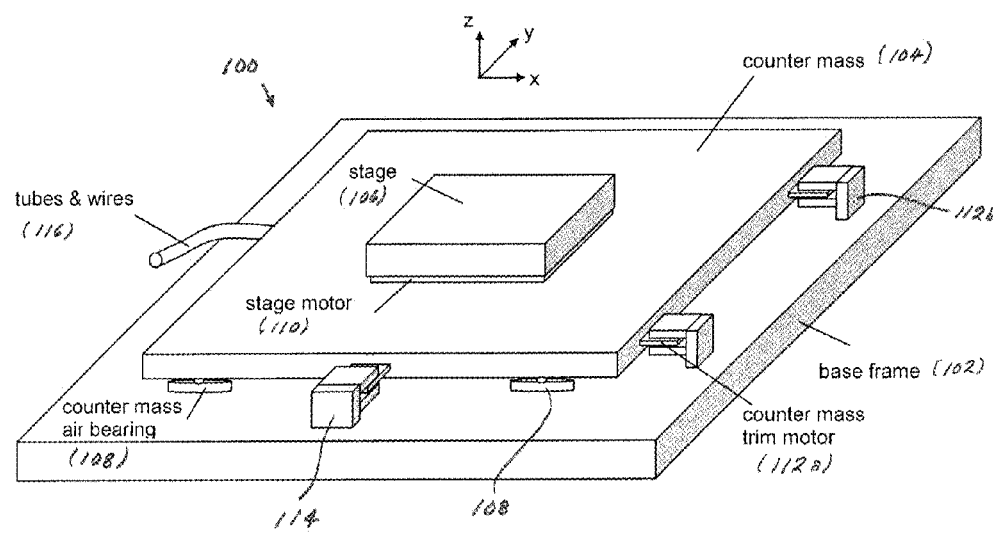
FIG. 1 is a schematic depiction of a stage including a counter-mass and trim-motors.

A schematic diagram of a stage assembly 100 is shown in FIG. 1. The stage assembly 100 includes a base frame 102, a counter-mass 104, and a movable stage mass 106. The counter-mass 104 is supported by air bearings 108 relative to the base frame 102 so as to allow the counter-mass to move in the x-y plane relative to the base frame 102 substantially without friction. Mounted to the surface of the counter-mass 104 is a stage motor 110 to which the movable stage mass 106 is mounted. Actuation of the stage motor 110 causes corresponding motion of the movable stage mass 106 relative to the counter-mass 104, accompanied by corresponding reaction motion of the counter-mass relative to the base frame 102. Coupled between the counter-mass 104 and the base frame 102 are counter-mass trim-motors 112a, 112b, 114. In the configurations shown, there are two x-direction trim-motors 112a, 112b and one y-direction trim motor 114. The y-direction trim-motor 114 controls the y-position of the counter-mass 104. The two x-direction trim motors 112a, 112b not only control the x-position and x-direction movement of the counter-mass 104, but also control yaw (denoted $\theta_x$ or $T_x$) of the counter-mass 104 relative to the base frame 102.

As suggested by FIG. 1, the counter-mass 104 in a stage assembly 100 can be massive, depending upon the corresponding movable stage mass 106 and depending upon the displacement of the counter-mass that can be accommodated relative to the corresponding displacement of the movable stage mass. For example, in some stage assemblies the counter-mass 104 is approximately 10× more massive than the movable stage mass 106. To ensure that movement of the counter-mass 104 is truly reactive to corresponding motion of the movable stage mass 106, the stage motor(s) 110 is mounted to the counter-mass. Thus, motion of the movable stage mass 106 in a particular direction causes corresponding motion of the counter-mass 104 in the opposite direction.

Since the stage motor(s) 110 is mounted to the counter-mass 104, the counter-mass usually has electrical wires, cables, and coolant tubes 116 connecting the counter-mass to components and assemblies located elsewhere in the precision system.

This disclosure sets forth, inter alia, calibration methods for correcting variations in the stage-force constant of a stage, such as but not limited to a wafer stage, occurring over time. The calibration methods are performed periodically, such as wafer-by-wafer. The calibration is performed using stage-force command information obtained during movement and unloading of the previous wafer from the stage or during pre-stepping motions of the stage occurring before actual exposure of a wafer. Hence, execution of the calibration method need not consume any significant time that would reduce throughput of the system comprising the stage.

An embodiment of a method as discussed below produces accurate calibrations of the force-constant according to force-command information from a single stepping motion performed before each wafer is exposed. Due to the finite bandwidth of stage closed-loop control, the force-command ratio at different temperatures may not accurately reflect variations of the force-constant ratio. This embodiment compensates for this variation using an "inverse closed loop" factor, measured along with the baseline force information with the same stepping motion as in the subsequent wafer-by-wafer calibration.

This calibration method accurately updates the compensation ratio for the variation in stage-force constant before every wafer exposure. Very little computation is required. It can significantly reduce drift in machine performance, and has no adverse impact on throughput.

More specifically, described below is a simple wafer-by-wafer calibration method for time-dependent variations in stage-force constant, using stage deceleration force commands of pre-stepping motion before wafer exposure.

Formulation for a Simple Gain-Drifting System

Here we consider a closed-loop stage system with a time-variant plant $(1+\alpha(t))P(s)$ (see FIG. 2), where $\alpha(t)$ is the gain-variation coefficient (also called the "force-variation coefficient," gain-variation ratio," and "force-variation ratio") of the plant P. This variation in plant-gain may be treated with a gain-compensation factor $\lambda(t)$ with an estimated value $\hat{\alpha}(t)$ of the gain-variation coefficient:

$$\lambda(t) = \frac{1}{1 + \hat{\alpha}(t)} \qquad (1)$$

In the following, $\hat{\alpha}(t)=0$ is first set as a default value.

As expressed in Equation (2), the total-force command U depends on the force-variation ratio $\alpha(t)$, which is a function of temperature t or of time more generally.

$$U(s) = \frac{G_{FF} + C}{1 + (1 + \alpha)PC} \cdot R(s) \qquad (2)$$

At two different temperatures, $t_1$ and $t_2$, the force-variation coefficients are different and so are the respective magnitudes of the force:

$$\alpha_1 \equiv \alpha(t_1) \quad (3A)$$

$$\alpha_2 \equiv \alpha(t_2) \quad (3B)$$

$$U_1(s) \equiv \frac{G_{FF} + C}{1 + (1 + \alpha_1)PC} \cdot R(s) \quad (4A)$$

$$U_2(s) \equiv \frac{G_{FF} + C}{1 + (1 + \alpha_2)PC} \cdot R(s) \quad (4B)$$

Note that the ratio of respective force-commands at two temperatures does not depend on feed-forward control:

$$\frac{U_2(s)}{U_1(s)} = \frac{1 + (1 + \alpha_1)PC}{1 + (1 + \alpha_2)PC} \quad (5)$$

Consequently, the ratio by which the force-commands vary can be calculated and simplified is expressed below $$\left( \text{assuming } \frac{PC}{1 + (1 + \alpha_2)PC} \approx \frac{PC}{1 + PC} \text{ for small values of } \alpha_2 \right):$$

$$\frac{U_2(s) - U_1(s)}{U_1(s)} = \frac{(\alpha_1 - \alpha_2)PC}{1 + (1 + \alpha_2)PC} \approx (\alpha_1 - \alpha_2) \cdot \frac{PC}{1 + PC} \quad (6)$$

The ratio of respective values of the force-constant for two temperatures may be estimated:

$$\alpha_1 - \alpha_2 \approx \left( \frac{PC}{1 + PC} \right)^{-1} \cdot \frac{U_2(s) - U_1(s)}{U_1(s)} \quad (7)$$

This estimation requires the inverse closed-loop model, which might be approximated by a $2^{nd}$- or $4^{th}$-order transfer function.

Alternatively, for a given trajectory, the effect of the inverse closed-loop mode can be further approximated as a scalar (a real number, $\beta$, called the "inverse closed-loop factor" or "beta"), as expressed below, where $u_1$ and $u_2$ are force commands in the time domain at temperatures $t_1$ and $t_2$, respectively:

$$\alpha_1 - \alpha_2 \approx \beta \cdot \frac{u_2 - u_1}{u_1} \quad (8)$$

For a more proper expression, Equation (8) may be re-written as follows with cumulative summation (and use of a low-pass filter if necessary) applied to the force commands within a time interval of interest, (such as the deceleration portion $\kappa_{dec}$ of a pre-stepping motion):

$$\alpha_1 - \alpha_2 = \beta \cdot \frac{\sum_{k \in K_{dec}} u_2(k) - \sum_{k \in K_{dec}} u_1(k)}{\sum_{k \in K_{dec}} u_1(k)} \quad (9)$$

Force-Variation Calibration with Inverse Closed-Loop Factor ("Beta")

In this embodiment the calibration may be separated into two steps as described below.

A first step is directed to measuring the baseline force and estimating the inverse closed-loop factor $\beta$ ("beta"). The current gain-variation coefficient $\alpha(t)$ is normally not known at this point. To estimate $\beta$ from Equation (9), identical pre-stepping trajectories of the stage (before using the stage for making exposures) are executed twice. Also, an assumption is made that the stage temperature does not change, which results in $\alpha_{baseline}$ (a baseline value of the force-variation coefficient, $\alpha(t)$) remaining substantially constant. The first pre-stepping trajectory is executed for measuring baseline force $u_{baseline}$. During this trajectory, no compensation is applied (i.e., estimated value of $\alpha$ is zero, i.e., $\hat{\alpha}=0$). The second pre-stepping trajectory is executed for measuring calibration force $u_{calibration}$. During this trajectory a typical value for $\hat{\alpha}=\hat{\alpha}_{calibration}$ may be selected and applied to the force compensation to artificially "generate" a temperature-variation effect, roughly equivalent to $\alpha_{baseline}-\hat{\alpha}_{calibration}$. According to Equation (9), the force-difference ratio of the above two pre-stepping motions may be described:

$$\alpha_{baseline} - (\alpha_{baseline} - \alpha_{calibration}) = \quad (10)$$

$$\beta \cdot \frac{\sum_{k \in K_{dec}} u_{calibration}(k) - \sum_{k \in K_{dec}} u_{baseline}(k)}{\sum_{k \in K_{dec}} u_{baseline}(k)}$$

Then, $\beta$ may be estimated as follows:

$$\beta = \hat{\alpha}_{calibration} \cdot \frac{\sum_{k \in K_{dec}} u_{baseline}(k)}{\sum_{k \in K_{dec}} u_{calibration}(k) - \sum_{k \in K_{dec}} u_{baseline}(k)} \quad (11)$$

In a second step, wafer-by-wafer force calibrations are made during pre-stepping motions of the stage. After estimating $\beta$, the force-command data obtained during the pre-stepping motions are used before every $i^{th}$ wafer exposure to estimate the residual force-variation ratio $\Delta\hat{\alpha}_i$ with the application of $\lambda_{i-1}(t)$, which is obtained from the calibration of the previous wafer. For the first wafer, we use $\lambda_0(t)=1$ since no wafer has been processed beforehand.

$$\alpha_{baseline} - \Delta\hat{\alpha}_i = \beta \cdot \frac{\sum_{k \in K_{dec}} u_i(k) - \sum_{k \in K_{dec}} u_{baseline}(k)}{\sum_{k \in K_{dec}} u_{baseline}(k)} \quad (12)$$

Here, $$\sum_{k \in K_{dec}} u_{baseline}(k)$$

is the saved single-scalar value from the earlier estimation of β, and $$\sum_{k \in K_{dec}} u_i(k)$$

is the cumulative sum of the force commands up to the $i^{th}$ wafer. To calibrate the overall loop gain of the system relative to the baseline level, the force-compensation factor $\lambda_i(t)$ may subsequently be updated to cover the estimated residual force-variation ratio $\Delta \hat{\alpha}_i$, as follows:

$$\lambda_i = \lambda_{i-1} \cdot (1 - \Delta \hat{\alpha}_i) = \lambda_{i-1} \cdot \left( 1 + \beta \cdot \frac{\sum_{k \in K_{dec}} u_i(k) - \sum_{k \in K_{dec}} u_{baseline}(k)}{\sum_{k \in K_{dec}} u_{baseline}(k)} \right), \quad (13)$$

and $\lambda_0 = 1$

The estimated total ratio of force-variation $\hat{\alpha}$ (i.e., deviation from baseline) may then be updated before each wafer exposure:

$$\hat{\alpha}_i = \frac{1}{\lambda_i} - 1 \quad (14)$$

Calibrations of Force-Variations Made Without including the Inverse Closed-Loop Factor β

Whenever the major components of trajectory frequency are much lower than the bandwidth of the closed-loop system, the inverse closed-loop factor may be simplified to equal unity:

$$\beta = 1 \quad (15)$$

Subsequently, the calibration method for the $i^{th}$ wafer (Equation (13)) may be simplified to Equation (16):

$$\lambda_i = \lambda_{i-1} \cdot \frac{\sum_{k \in K_{dec}} u_i(k)}{\sum_{k \in K_{dec}} u_{baseline}(k)}, \text{ and } \lambda_0 = 1 \quad (16)$$

Simulations for Calibrating Variations in Force-Constant

FIG. 3 is a simulation model, including a plant model (rigid body with a vibration mode), 2000-Hz amplifier ($2^{nd}$-order low-pass filter), force-constant variation coefficient, and position/force resolution. First, a virtual system is experienced without the limitations of position/force resolution. In FIG. 3 the system bandwidth of the closed-loop is tuned to about 200 Hz (see FIG. 4A). The flexible mode is intentionally not well treated in order to perceive its influence on the force calibration.

In this simulation example, the force-command during deceleration of pre-stepping motions (FIG. 4B; acceleration and velocity trajectories) is used before stage exposure to calibrate the force variations. For the same exposure process, deceleration occurs at the same stage-position; hence, position-dependent issues do not affect the force-calibration method. After the force-compensation ratio has been updated, a new wafer-exposure sequence can begin with the first two shots as illustrated in FIG. 4C. For simplicity, this simulation only uses the wafer y-axis; the same calibration methods may also be applied to the wafer x-axis and the reticle y-axis.

In a first step of this embodiment, measurements are obtained of the baseline force, and an estimation is obtained of the inverse closed-loop factor β. First, the pre-stepping trajectory is run without temperature compensation ($\alpha = 0$), while the force-<command values are accumulated during deceleration as the baseline $$\sum_{k \in K_{dec}} u_{baseline}(k).$$

At this moment, the stage-force constant may already be slightly different from the nominal value (e.g., by 0.4%, wherein $\alpha_{baseline} = -0.004$). Next, to create an artificial change in the force-constant, a force-correction factor of, e.g., $\hat{\alpha}_{calibration} = 0.005$ is used to run the stage with the same pre-stepping trajectory. Meanwhile, the force-command values are accumulated before the force-variation compensation:

$$\sum_{k \in K_{dec}} u_{calibration}(k).$$

It may be assumed that, during those two pre-stepping motions, the stage temperature remains substantially the same. The force-command values of the two pre-stepping motions (which are slightly different as illustrated by FIG. 5A) are used to calculate the inverse closed-loop factor β=0.95881988763288 using Equation (11).

The foregoing measurement of baseline force and estimation of β ("beta") may be done during resetting of the stage system. These two pieces of information are used later for calibrating the force wafer-by-wafer before each wafer exposure.

In a second step force calibrations are made wafer-by-wafer. An applicable assumption is that the stage-force constant decreases with increases in wafer number, as shown in FIG. 5B (which may be much more severe than in a real machine). Without a force calibration, the force-command of a pre-stepping motion significantly changes from wafer-to-wafer as shown by FIG. 6A. FIGS. 6A-6C (upper plots) are respective plots of pre-stepping force-commands of wafers 1-10, without limitation on the resolution of position/force. In each figure, the lower plots are of respective deviations exhibited by the ten wafers from force-commands from the baseline forces measured in the first step.

Calibrations performed wafer-by-wafer can be done with the pre-stepping force-command, with or without the "inverse closed-loop factor" β (Equation (16) or (13), respectively; see FIGS. 6C and 6B, respectively). Either calibration method reduces the pre-stepping deviations of force-commands, which are due mostly to wafer-to-wafer temperature changes. Before each wafer-exposure begins, the calibrated force compensation is updated according to Equation (16) or (13).

As shown in FIGS. 7A-7C, either calibration method highly reduces the force deviations among wafers. Calibration with β particularly works very accurately. FIGS. 7A-7C are plots of force-deviation ratios of the $i^{th}$ wafer from the first wafer, $$\frac{\left(\frac{1+\alpha_i}{1+\hat{\alpha}_i}\right)}{\left(\frac{1+\alpha_1}{1+\hat{\alpha}_1}\right)} - 1$$

without limitation as to the resolution of position/force. Force calibrations lead to more consistent force-commands among different wafers, particularly when β is used. Since the 500-Hz flexible mode is intentionally not well treated, the associated vibrations gradually increase in the force commands of the second shot. But, the plant flexible mode does not seem to affect the calibrations.

FIGS. 8A-8C are plots of the first two shot force-commands of each wafer, without limitation of resolution of position/force. FIG. 8A is without calibration, FIG. 8B is calibration without β, and FIG. 8C is calibration with β.

The same observations (as in force commands above) are obtained in the stage-following errors. See FIGS. 9A-9C, which include plots of the first two following-error deviations from the first wafer, without limitation on the resolution of position/force.

So far, limitations of position and force resolutions to the simulation model have not been imposed. To see the influence of sensor and force resolution on force calibration, we repeat the same simulations with 0.06 [N] force resolution and 0.3 position resolution. It turns out that these resolution limitations do not affect the calibrations. The inverse closed-loop factor (β=0.95899135800628) and force-deviation ratios (shown below) remain very much the same as before (without resolution limitations). Reference is made to FIGS. 10A-10C, which are plots of force-deviation ratio of the ith wafer from the first wafer $$\frac{\left(\frac{1+\alpha_i}{1+\hat{\alpha}_i}\right)}{\left(\frac{1+\alpha_1}{1+\hat{\alpha}_1}\right)} - 1$$

for a force resolution of 0.06 N and a position resolution of 0.3 nm.

Calibrations performed with and without β the inverse closed-loop factor seem to lead to similar force consistency among different wafers due to the sensor and force resolutions, as illustrated in FIGS. 11A-11C. FIGS. 11A-11C are plots of the first two shot-force commands of each wafer at 0.06 N force resolution and 0.3 nm position resolution.

However, as shown in FIGS. 12A-12C, in terms of following-error variations, calibration with β still leads to better results than without. FIGS. 12A-12C are plots of the deviations of the first two-shot following error from the first wafer, at 0.06 N force resolution and 0.3 nm position resolution.

Precision System

Turning now to FIG. 13, certain features of an immersion lithography system (an exemplary precision system) are shown, namely, a light source 540, an illumination-optical system 542, a reticle stage 544, a projection-optical system 546, and a wafer (substrate) stage 548, all arranged along an optical axis A. The light source 540 is configured to produce a pulsed beam of illumination light, such as DUV light of 248 nm as produced by a KrF excimer laser, DUV light of 193 nm as produced by an ArF excimer laser, or DUV light of 157 nm as produced by an $F_2$ excimer laser. The illumination-optical system 542 includes an optical integrator and at least one lens that conditions and shapes the illumination beam for illumination of a specified region on a patterned reticle 550 mounted to the reticle stage 544. The pattern as defined on the reticle 550 corresponds to the pattern to be transferred lithographically to a wafer 552 that is held on the wafer stage 548. Lithographic transfer in this system is by projection of an aerial image of the pattern from the reticle 550 to the wafer 552 using the projection-optical system 546. The projection-optical system 546 typically comprises many individual optical elements (not detailed) that project the image at a specified demagnification ratio (e.g., 1/4 or 1/5) on the wafer 552. So as to be imprintable, the wafer surface is coated with a layer of a suitable exposure-sensitive material termed a "resist."

The reticle stage 544 is configured to move the reticle 550 in the X-direction, Y-direction, and rotationally about the Z-axis. To such end, the reticle stage is equipped with one or more linear motors having cooled coils as described herein. The two-dimensional position and orientation of the reticle 550 on the reticle stage 544 are detected by a laser interferometer (not shown) in real time, and positioning of the reticle 550 is effected by a main control unit on the basis of the detection thus made.

The wafer 552 is held by a wafer holder ("chuck," not shown) on the wafer stage 548. The wafer stage 548 includes a mechanism (not shown) for controlling and adjusting, as required, the focusing position (along the Z-axis) and the tilting angle of the wafer 552. The wafer stage 548 also includes electromagnetic actuators (e.g., linear motors or a planar motor, or both) for moving the wafer in the X-Y plane substantially parallel to the image-formation surface of the projection-optical system 546. These actuators desirably comprise linear motors, one more planar motors, or both.

The wafer stage 548 also includes mechanisms for adjusting the tilting angle of the wafer 552 by an auto-focusing and auto-leveling method. Thus, the wafer stage serves to align the wafer surface with the image surface of the projection-optical system. The two-dimensional position and orientation of the wafer are monitored in real time by another laser interferometer (not shown). Control data based on the results of this monitoring are transmitted from the main control unit to a drive circuits for driving the wafer stage. During exposure, the light passing through the projection-optical system is made to move in a sequential manner from one location to another on the wafer, according to the pattern on the reticle in a step-and-repeat or step-and-scan manner.

The projection-optical system 546 normally comprises many lens elements that work cooperatively to form the exposure image on the resist-coated surface of the wafer 552. For convenience, the most distal optical element (i.e., closest to the wafer surface) is an objective lens 553. Since the depicted system is an immersion lithography system, it includes an immersion liquid 554 situated between the objective lens 553 and the surface of the wafer 552. As discussed above, the immersion liquid 554 is of a specified type. The immersion liquid is present at least while the pattern image of the reticle is being exposed onto the wafer.

The immersion liquid 554 is provided from a liquid-supply unit 556 that may comprise a tank, a pump, and a temperature regulator (not individually shown). The liquid 554 is gently discharged by a nozzle mechanism 555 into the gap between the objective lens 553 and the wafer surface. A liquid-recovery system 558 includes a recovery nozzle 57 that removes liquid from the gap as the supply 56 provides fresh liquid 554. As a result, a substantially constant volume of continuously replaced immersion liquid 554 is provided between the objective lens 553 and the wafer surface. The temperature of the liquid is regulated to be approximately the same as the temperature inside the chamber in which the lithography system itself is disposed.

Also shown is a sensor window 560 extending across a recess 562, defined in the wafer stage 548, in which a sensor 564 is located. Thus, the window 560 sequesters the sensor 564 in the recess 562. Movement of the wafer stage 548 so as to place the window 560 beneath the objective lens 553, with continuous replacement of the immersion fluid 554, allows a beam passing through the projection-optical system 546 to transmit through the immersion fluid and the window 560 to the sensor 564.

Referring now to FIG. 14, an alternative embodiment of a precision system that can include one or more electromagnetic actuators having actively cooled coils as described herein is an EUVL system 900, as a representative precision system incorporating an electromagnetic actuator as described herein, is shown. The depicted system 900 comprises a vacuum chamber 902 including vacuum pumps 906a, 906b that are arranged to enable desired vacuum levels to be established and maintained within respective chambers 908a, 908b of the vacuum chamber 902. For example, the vacuum pump 906a maintains a vacuum level of approximately 50 mTorr in the upper chamber (reticle chamber) 908a, and the vacuum pump 906b maintains a vacuum level of less than approximately 1 mTorr in the lower chamber (optical chamber) 908b. The two chambers 908a, 908b are separated from each other by a barrier wall 920. Various components of the EUVL system 900 are not shown, for ease of discussion, although it will be appreciated that the EUVL system 900 can include components such as a reaction frame, a vibration-isolation mechanism, various actuators, and various controllers.

An EUV reticle 916 is held by a reticle chuck 914 coupled to a reticle stage 910. The reticle stage 910 holds the reticle 916 and allows the reticle to be moved laterally in a scanning manner, for example, during use of the reticle for making lithographic exposures. Between the reticle 916 and the barrier wall 920 is a blind apparatus. An illumination source 924 produces an EUV illumination beam 926 that enters the optical chamber 908b and reflects from one or more mirrors 928 and through an illumination-optical system 922 to illuminate a desired location on the reticle 916. As the illumination beam 926 reflects from the reticle 916, the beam is "patterned" by the pattern portion actually being illuminated on the reticle. The barrier wall 920 serves as a differential-pressure barrier and can serve as a reticle shield that protects the reticle 916 from particulate contamination during use. The barrier wall 920 defines an aperture 934 through which the illumination beam 926 may illuminate the desired region of the reticle 916. The incident illumination beam 926 on the reticle 916 becomes patterned by interaction with pattern-defining elements on the reticle, and the resulting patterned beam 930 propagates generally downward through a projection-optical system 938 onto the surface of a wafer 932 held by a wafer chuck 936 on a wafer stage 940 that performs scanning motions of the wafer during exposure. Hence, images of the reticle pattern are projected onto the wafer 932.

The wafer stage 940 can include (not detailed) a positioning stage that may be driven by a planar motor or one or more linear motors, for example, and a wafer table that is magnetically coupled to the positioning stage using an EI-core actuator, for example. The wafer chuck 936 is coupled to the wafer table, and may be levitated relative to the wafer table by one or more voice-coil motors, for example. If the positioning stage is driven by a planar motor, the planar motor typically utilizes respective electromagnetic forces generated by magnets and corresponding armature coils arranged in two dimensions. The positioning stage is configured to move in multiple degrees of freedom of motion, e.g., three to six degrees of freedom, to allow the wafer 932 to be positioned at a desired position and orientation relative to the projection-optical system 938 and the reticle 916.

An EUVL system including the above-described EUV-source and illumination-optical system can be constructed by assembling various assemblies and subsystems in a manner ensuring that prescribed standards of mechanical accuracy, electrical accuracy, and optical accuracy are met and maintained. To establish these standards before, during, and after assembly, various subsystems (especially the illumination-optical system 922 and projection-optical system 938) are assessed and adjusted as required to achieve the specified accuracy standards. Similar assessments and adjustments are performed as required of the mechanical and electrical subsystems and assemblies. Assembly of the various subsystems and assemblies includes the creation of optical and mechanical interfaces, electrical interconnections, and plumbing interconnections as required between assemblies and subsystems. After assembling the EUVL system, further assessments, calibrations, and adjustments are made as required to ensure attainment of specified system accuracy and precision of operation. To maintain certain standards of cleanliness and avoidance of contamination, the EUVL system (as well as certain subsystems and assemblies of the system) are assembled in a clean room or the like in which particulate contamination, temperature, and humidity are controlled.

Semiconductor devices can be fabricated by processes including microlithography steps performed using a microlithography system as described above. Referring to FIG. 15, in step 701 the function and performance characteristics of the semiconductor device are designed. In step 702 a reticle ("mask") defining the desired pattern is designed and fabricated according to the previous design step. Meanwhile, in step 703, a substrate (wafer) is fabricated and coated with a suitable resist. In step 704 ("wafer processing") the reticle pattern designed in step 702 is exposed onto the surface of the substrate using the microlithography system. In step 705 the semiconductor device is assembled (including "dicing" by which individual devices or "chips" are cut from the wafer, "bonding" by which wires are bonded to particular locations on the chips, and "packaging" by which the devices are enclosed in appropriate packages for use). In step 706 the assembled devices are tested and inspected.

Representative details of a wafer-processing process including a microlithography step are shown in FIG. 16. In step 711 ("oxidation") the wafer surface is oxidized. In step 712 ("CVD") an insulative layer is formed on the wafer surface by chemical-vapor deposition. In step 713 (electrode formation) electrodes are formed on the wafer surface by vapor deposition, for example. In step 714 ("ion implantation") ions are implanted in the wafer surface. These steps 711-714 constitute representative "pre-processing" steps for wafers, and selections are made at each step according to processing requirements.

At each stage of wafer processing, when the pre-processing steps have been completed, the following "post-processing" steps are implemented. A first post-process step is step 715 ("photoresist formation") in which a suitable resist is applied to the surface of the wafer, Next, in step 716 ("exposure"), the microlithography system described above is used for lithographically transferring a pattern from the reticle to the resist layer on the wafer. In step 717 ("developing") the exposed resist on the wafer is developed to form a usable mask pattern, corresponding to the resist pattern, in the resist on the wafer. In step 718 ("etching"), regions not covered by developed resist (i.e., exposed material surfaces) are etched away to a controlled depth. In step 719 ("photoresist removal"), residual developed resist is removed ("stripped") from the wafer.

Formation of multiple interconnected layers of circuit patterns on the wafer is achieved by repeating the pre-processing and post-processing steps as required. Generally, a set of pre-processing and post-processing steps are conducted to form each layer.

In summary, a simple method is disclosed by which the time-dependent variations in force-constant can be calibrated wafer-by-wafer. I.e., a calibrations are made using the deceleration-force command data from the stage pre-stepping motion performed before every wafer exposure. The inverse closed-loop factor ($\beta$) can be easily estimated from an extra pre-stepping motion performed during the baseline force measurement. Beta significantly enhances the calibration effectiveness without the need for using perfect force commands. The effectiveness of the calibration method is not affected by flexible-mode dynamics of the plant or sensor/force resolutions.

Whereas the invention has been described in connection with representative embodiments, it will be understood that it is not limited to those embodiments. On the contrary, it is intended to encompass all alternatives, modifications, and equivalents as may be included within the spirit and scope of the invention as defined by the appended claims.

What is claimed is:

1. A method for calibrating a movable stage coupled to an actuator that receives force commands from a controller, the method comprising:
obtaining baseline information by generating a first motion of the moveable stage with the actuator;
obtaining calibration information by generating a second motion of the moveable stage with the actuator at different time from a time of the first motion of the movable stage;
estimating a first force-variation ratio from the baseline information and the calibration information in at least one of the first motion and the second motion;
updating a force-compensation factor of the controller using the estimated first force-variation ratio; and
determining a force-variation coefficient of the movable stage from the force compensation factor.

2. The method of claim 1, further comprising:
estimating a second force-variation ratio of the baseline information and the calibration information; and
estimating an inverse closed loop factor based on the second ratio and a force command associated with the first motion and a force command associated with the second motion.

3. The method of claim 2, wherein:
the inverse closed-loop factor is equal to unity; and
the force-compensation factor is determined from a ratio of a force exerted by the moveable stage relative to a baseline force associated with the baseline information.

4. The method of claim 2, wherein:
the first motion and the second motion of the movable stage comprise a first trajectory and a second trajectory; and
no compensation for the time variation is applied during the first trajectory.

5. The method of claim 4, wherein a typical value for the force-variation coefficient is selected and applied to force compensation.

6. The method of claim 2, wherein subsequent associated first motions and second motions of the moveable stage are made for each use of the moveable stage for moving an object.

7. The method of claim 2, wherein, during the second motion, a typical value of the force-variation coefficient is selected and applied to the force compensation to produce a temperature-variation effect.

8. The method of claim 7, wherein the inverse closed-loop factor is estimated as a force-variation ratio of the baseline information relative to the calibration information, multiplied by the typical value of the force-variation coefficient.

9. The method of claim 2, wherein, in at least one of the first motion and the second motion, respective force calibrations are made before every $i^{th}$ use of the movable stage to estimate the first force-variation ratio.

10. The method of claim 9, wherein the first force-variation ratio is estimated with application of a force-compensation factor obtained from calibration of the movable stage during an immediately preceding use of the movable stage for holding an object.

11. The method of claim 10, wherein, in at least one of the first motion and the second motion, the inverse closed-loop factor is used to estimate the first force-variation ratio.

12. The method of claim 11, wherein the force-compensation factor is updated according to a force-variation ratio of a measured stage force obtained during at least one of the first motion and the second motion.

13. An exposure method in which a pattern is formed on an object, comprising:
providing a movable stage;
positioning the object using the method of claim 12; and
retaining the object with the movable stage.

14. A device manufacturing method, comprising:
forming a pattern on an object using the method of claim 13; and
developing the object on which the pattern is formed.

15. A method for positioning an object held on a movable stage which is driven by an actuator coupled to the movable stage, the method comprising:
calibrating the movable stage by the method of claim 1;
retaining the object with the movable stage; and
controlling the actuator with a controller by applying a force command to the actuator.

* * * * *